(12) United States Patent
Jang et al.

(10) Patent No.: US 11,326,264 B2
(45) Date of Patent: May 10, 2022

(54) MEMBRANE ELECTRODE ASSEMBLY FOR PROTON EXCHANGE MEMBRANE WATER ELECTROLYZER AND METHOD OF PREPARING MEMBRANE ELECTRODE ASSEMBLY FOR PROTON EXCHANGE MEMBRANE WATER ELECTROLYZER

(71) Applicant: KOREA INSTITUTE OF SCIENCE AND TECHNOLOGY, Seoul (KR)

(72) Inventors: Jong Hyun Jang, Seoul (KR); Seunghoe Choe, Seoul (KR); Youngseung Na, Seoul (KR); Hye Jin Lee, Seoul (KR); Hyoung-Juhn Kim, Seoul (KR); Dirk Henkensmeier, Seoul (KR); Sung Jong Yoo, Seoul (KR); Jin Young Kim, Seoul (KR); So Young Lee, Seoul (KR); Hyun Seo Park, Seoul (KR)

(73) Assignee: KOREA INSTITUTE OF SCIENCE AND TECHNOLOGY, Seoul (KR)

( * ) Notice: Subject to any disclaimer, the term of this patent is extended or adjusted under 35 U.S.C. 154(b) by 0 days.

(21) Appl. No.: 16/122,640

(22) Filed: Sep. 5, 2018

(65) Prior Publication Data
US 2019/0071786 A1 Mar. 7, 2019

(30) Foreign Application Priority Data
Sep. 6, 2017 (KR) .................. 10-2017-0114084

(51) Int. Cl.
*C25B 11/051* (2021.01)
*C25B 1/04* (2021.01)
(Continued)

(52) U.S. Cl.
CPC .............. *C25B 11/051* (2021.01); *C25B 1/04* (2013.01); *C25B 9/19* (2021.01); *C25B 9/23* (2021.01); *C25B 9/73* (2021.01); *C25B 11/069* (2021.01)

(58) Field of Classification Search
CPC .... C25B 1/10; C25B 9/23; C25B 1/04; C25D 5/34–46
See application file for complete search history.

(56) References Cited

U.S. PATENT DOCUMENTS 3,650,861 A * 3/1972 Angell .................... C23C 22/46
427/309
4,057,479 A * 11/1977 Campbell ................ C25B 1/10
204/258
(Continued)

FOREIGN PATENT DOCUMENTS

JP 2011-29171 A 2/2011
JP 2014-152341 A 8/2014
(Continued)

OTHER PUBLICATIONS

Lee et al., Development of electrodeposited IrO2 electrodes as anodes in polymer electrolyte membrane water electrolysis, 179 Applied Catalysis B: Environmental 285 (Year: 2015).*
(Continued)

*Primary Examiner* — Harry D Wilkins, III
*Assistant Examiner* — Ho-Sung Chung
(74) *Attorney, Agent, or Firm* — Birch, Stewart, Kolasch & Birch, LLP

(57) ABSTRACT

Provided is a membrane electrode assembly for a proton exchange membrane water electrolyzer, including: an oxygen electrode including an iridium oxide ($IrO_2$) layer which is an electrodeposited oxygen electrode catalyst layer on a titanium (Ti) layer which is a diffusion layer; a hydrogen electrode in which a hydrogen electrode catalyst layer is
(Continued)

formed on a diffusion layer; and an electrolyte membrane placed between the oxygen electrode catalyst layer and the hydrogen electrode catalyst layer, in which a portion of the pores of the Ti diffusion layer are filled with an electrolyte of the electrolyte membrane.

7 Claims, 22 Drawing Sheets

(51) Int. Cl.
*C25B 9/19* (2021.01)
*C25B 9/23* (2021.01)
*C25B 9/73* (2021.01)
*C25B 11/069* (2021.01)

(56) References Cited

U.S. PATENT DOCUMENTS

| | | | |
|---|---|---|---|
| 4,715,938 A * | 12/1987 | Billings | C25B 9/20 |
| | | | 205/629 |
| 2005/0035086 A1* | 2/2005 | Chen | C23C 4/00 |
| | | | 216/83 |
| 2012/0094215 A1 | 4/2012 | Satou et al. | |
| 2013/0186764 A1* | 7/2013 | Feng | C23G 1/103 |
| | | | 205/210 |
| 2017/0183788 A1* | 6/2017 | Iida | C25B 11/0447 |
| 2018/0274112 A1* | 9/2018 | Moon | H01M 8/1004 |
| 2019/0071784 A1* | 3/2019 | Yoshinaga | C25B 9/23 |

FOREIGN PATENT DOCUMENTS

| | | |
|---|---|---|
| JP | 2017-115232 A | 6/2017 |
| KR | 10-2009-0032313 A | 4/2009 |
| KR | 10-2011-0124415 A | 11/2011 |
| KR | 10-2017-0034581 A | 3/2017 |
| KR | 10-2017-0058352 A | 5/2017 |

OTHER PUBLICATIONS

Kim et al., "Sn-modified Platinized Ti," Korean Chem. Eng. Res. (Apr. 2007), vol. 45, No. 2, pp. 124-132 (with English abstract).

Andolfatto et al., "Solid Polymer Electrolyte Water Electrolysis: Electrocatalysis and Long-Term Stability", Int. J. Hydrogen Energy, vol. 19, No. 5, 1994, pp. 421-427.

Carmo et al., "A comprehensive review on PEM water electrolysis", International Journal of Hydrogen Energy, vol. 38, 2013, pp. 4901-4934.

Debe et al., "Initial Performance and Durability of Ultra-Low Loaded NSTF Electrodes for PEM Electrolyzers", Journal of The Electrochemical Society, vol. 159, 2012, pp. K165-K176.

Lettenmeier et al., "Nanosized $IrO_x$—Ir Catalyst with Relevant Activity for Anodes of Proton Exchange Membrane Electrolysis Produced by a Cost-Effective Procedure", Angew. Chem. Int. Ed., 2016, vol. 55, pp. 742-746.

Marshall et al., "Performance of a PEM water electrolysis cell using $Ir_xRu_yTa_zO_2$ electrocatalysts for the oxygen evolution electrode", International Journal of Hydrogen Energy, vol. 32, 2007, pp. 2320-2324.

Oh et al., "Oxide-supported Ir nanodendrites with high activity and durability for the oxygen evolution reaction in acid PEM water electrolyzers", Chemical Science, vol. 6, 2015, pp. 3321-3328.

Rozain et al., "Influence of iridium oxide loadings on the performance of PEM water electrolysis cells: Part II—Advanced oxygen electrodes", Applied Catalysis B: Environmental, vol. 182, 2016, pp. 123-131.

Rozain et al., "Influence of iridium oxide loadings on the performance of PEM water electrolysis cells: Part I—Pure $IrO_2$-based anodes", Applied Catalysis B: Environmental, vol. 182, 2016, pp. 153-160.

Siracusano et al., "Nanosized IrOx and IrRuOx electrocatalysts for the $O_2$ evolution reaction in PEM water electrolysers", Applied Catalysis B: Environmental, vol. 164, 2015, pp. 488-495.

Skulimowska et al., "Proton exchange membrane water electrolysis with short-side-chain Aquivion membrane and $IrO_2$ anode catalyst", International Journal of Hydrogen Energy, vol. 39, 2014, pp. 6307-6316.

Slavcheva et al., "Sputtered iridium oxide films as electrocatalysts for water splitting via PEM electrolysis", Electrochimica Acta, vol. 52, 2007, pp. 3889-3894.

Xu et al., "The effects of ionomer content on PEM water electrolyser membrane electrode assembly performance", International Journal of Hydrogen Energy, vol. 35, 2010, pp. 12029-12037.

Zhang et al., "$IrO_2$ coated $TiO_2$ nanopore arrays electrode for SPE HBr electrolysis", Journal of Electroanalytical Chemistry, vol. 688, 2013, pp. 262-268.

* cited by examiner

MEMBRANE ELECTRODE ASSEMBLY FOR PROTON EXCHANGE MEMBRANE WATER ELECTROLYZER AND METHOD OF PREPARING MEMBRANE ELECTRODE ASSEMBLY FOR PROTON EXCHANGE MEMBRANE WATER ELECTROLYZER

CROSS-REFERENCE TO RELATED APPLICATION

This application claims the priority of Korean Patent Application No. 10-2017-0114084, filed on Sep. 6, 2017, and all the benefits accruing therefrom under 35 U.S.C. § 119, the contents of which in its entirety are herein incorporated by reference.

BACKGROUND

1. Field

The present disclosure relates to a new membrane electrode assembly for a proton exchange membrane water electrolyzer and a method of preparing the membrane electrode assembly for the proton exchange membrane water electrolyzer.

[Description of the National Support Research and Development]

This study was conducted with the support from the National Research Foundation of Korea funded by the Ministry of Science and ICT under the supervision of the Korea Institute of Energy Research, the project title is the KOREA CCS 2020 Project, and the project name is 'Development of innovation technology for $CO_2$ conversion to syn-gas by low-temperature electrolysis' (2N52570)(Project Identification No.: 2017028316).

This study was conducted with the support from the Korea Institute of Energy Technology Evaluation and Planning funded by the Ministry of Trade, Industry and Energy, Republic of Korea under the supervision of ELCHEMTECH Co., Ltd., the project title is Energy Technology Development Project (or New Renewable Energy), and the project name is 'Development of 350 bar PEM Electrolyzer to Reduce Hydrogen Production Cost' (2MR5380)(Project Identification No.: 20153010041750).

2. Description of the Related Art

Hydrogen is rapidly emerging as an alternative as an energy carrier in the future in order to overcome problems related to environment and coal depletion. However, currently, hydrogen production has usually relied on petrochemical processes such as steam-reforming of natural gas (48%), partial oxidation (30%), and coal gasification (18%), and inevitably emits carbon into atmosphere.

As an effort to reduce the dependency on fossil fuel and to suppress carbon emissions, the water electrolyzer (WE), a technology to split water into hydrogen and oxygen using electrical energy, has received much attention. This technology aims at storing energy prepared from renewable energy sources such as solar energy, wind power, and hydrothermal heat in a chemical form ($H_2$) and using the energy in fuel cells, and the like. Guided by recent growth in new renewable energy capacity, as well as development of fuel cell technology and reinforcement of regulation on greenhouse gases, the researches and the industrial applications of WE have grown exponentially over the last decade.

Among the water electrolyzers as aforementioned, there is a low-temperature water electrolyzer, and currently, in the low-temperature water electrolyzer, there are, for example, an alkaline water electrolyzer (AWE), a proton exchange membrane water electrolyzer (PEMWE), an anion exchange membrane water electrolyzer (AEMWE), and the like. Among them, the AWE has made up majority of commercial market share due to its technical maturity leading to relatively low cost, but there are drawbacks such as a need for large-scale plant and the use of toxic solvent, so that polymer electrolyte-based water electrolyzers such as PEMWE and AEMWE, which show high energy efficiency and have high $H_2$ purity, have been widely researched and recently commercialized for the applications of small- and medium-scale electrolyzer (<300 kW).

As an alternative for that, proton exchange membrane water electrolysis (PEMWE) can produce hydrogen having excellent purity at high yield, and thus, has received particular attention. Furthermore, the PEMWE has been widely used because there are also advantages in that the system has a small size and hazardous materials are not emitted.

However, when the PEMWE is used, the operational cost for the PEMWE reaches about 4.1 to about 8.6 €/$kgH_2$, which is relatively higher than those of the AWE (3.2 to 5.9 €/$kgH_2$), and the cost for initial investment (2,090 €/$kgH_2$) is also approximately double-folds compared to the AWE (1,100 €/$kgH_2$) due to high-priced materials such as Ti-based bipolar plate, nafion membrane, and PGM-based catalyst.

In consideration of scaling-up, PGM-based metals, which are currently used for both anode (Ir, Ru) and cathode (Pt), may be problematic because the amount of the metals is very limited. Though the cost of Ir currently makes up just 6% of stack, the wide use of the PEMWE would considerably raise the price of Ir. In this regard, according to recent review by Carmo et al. (Non-Patent Document 1), an amount of catalyst required at the anode metal (Pt, Ir, Ru) ranges about 2 mg/$cm^2$ (1 to 6 mg/$cm^2$), which is roughly 4-times higher than targeted total PGM loadings suggested by a project EU-NOVEL (less than 0.5 mg), and only few recent papers have reported a membrane electrode assembly (MEA) with a catalyst loading of less than 1 mg/$cm^2$. Therefore, further research efforts should be concentrated on to reduce the use of PGM-based metals for commercialization of the PEMWE.

Meanwhile, various processes including spray coating, decal, sputtering, and electrodeposition are used to prepare an electrode for a PEMWE. Among them, spraying and decal processes are preferred in most cases, and an anode prepared by those technologies is a particle-type electrode (FIG. 1A), and has exhibited excellent cell efficiency with a cell voltage of 1.55 to 1.8 V at, for example, 1 A/$cm^2$ and 80° C. However, even in this case, a required catalyst loading is relatively high (about 2 mg/$cm^2$), and it is difficult to reduce the catalyst loading of less than 0.5 mg/$cm^2$ without performance loss. Meanwhile, in this case, when a hydrogen electrode and an oxygen electrode are produced, and then the electrodes are assembled with each other, the electrodes may be assembled with each other by using a compression process in some cases, but it can be confirmed that the efficiency of a cell is reduced due to deterioration in performance of the hydrogen electrode (FIG. 1B). Meanwhile, in recent studies of Non-Patent Documents 2 and 3, an anode was prepared by decal method containing a catalyst at equal to or less than 0.5 mg/$cm^2$, but it could be confirmed that the anode suffered from considerable ohmic losses due to low conductivity of catalyst layer.

Meanwhile, a film-type electrode may also be prepared by sputtering and electrodeposition processes, and the film-type electrode showed lower performance loss even at reduced catalyst loading (<0.5 mg/cm$^2$) (FIG. 1C). In this regard, in Non-Patent 4, a sputtered IrO$_2$ catalyst (loading: 0.2 mg/cm$^2$) was applied to the PEMWE, and in this case, the PEMWE exhibited a voltage of 1.825 V at 1 A/cm$^2$ and 80° C. Further, in Non-Patent Document 5, various alloy films (Pt$_{68}$Co$_{29}$Mn$_3$, Pt$_{50}$Ir$_{50}$, and Pt$_{50}$Ir$_{25}$Ru$_{25}$) were prepared with sputtering, and their performance as cathode and anode catalysts of the PEMWE was tested. The best result they obtained is 1.7 V at 1 A/cm$^2$ and 80° C., using Pt black (4 mg/cm$^2$) and Pt$_{50}$Ir$_{50}$ (0.15 mgPt/cm$^2$) as anode and cathode catalysts, respectively. In addition, there have been recently conducted studies that the performance of sputtered IrO$_2$ electrode at the MEA level was improved (1.71 V at 1 A/cm$^2$ and 80° C. with 0.24 mg/cm$^2$) by optimizing the support, ionomer, and catalyst loadings.

Meanwhile, studies for preparing an electrodeposited IrO$_2$ catalyst (ED IrO$_2$) for a PEMWE have also been conducted, and in this case, the electrode exhibited excellent activity (1.6 at 1 A/cm$^2$ and 90° C.) with just 0.1 mg/cm$^2$ IrO$_2$ loading, but the use of a carbon-based material limits its industrial application. In addition, the film-type electrodes generally have shown lower cell efficiency than particle-type electrodes because of a 3-phase boundary where an electrode, an electrolyte, and a reactant meet together. In the case of the particle-type electrodes, the nano-sized catalyst dimension as well as mixed ionomer can provide a very high interfacial surface area between the electrode and the electrolyte, whereas in the case of the film-type electrodes, only a catalyst located at the top-most portion of a diffusion layer (DL) is contact with the electrolyte, limiting the proton transport from catalyst to electrode. Thickening the catalyst layer basically does not bring the enlargement of electrolyte/electrode interface for the film-type electrode. Therefore, even when a film-type electrode is prepared, there is a need for studies on an electrode in which the interface between electrolyte and electrode may be enlarged.

[References of the Related Art]

Non-Patent Documents (Non-Patent Document 1) M. Carmo, D. L. Fritz, J. Mergel, D. Stollen, Int. J. Hydrogen Energy 38 (2013) 4901-4934
(Non-Patent Document 2) C. Rozain, E. Mayousse, N. Guillet, P. Millet, Appl. Catal., B 182 (2016) 123-131.
(Non-Patent Document 3) C. Rozain, E. Mayousse, N. Guillet, P. Millet, Appl. Catal., B 182 (2016) 153-160.
(Non-Patent Document 4) E. Slavcheva, I. Radev, S. Bliznakov, G. Topalov, P. Andreev, E. Budevski, Electrochim. Acta 52 (2007) 3889-3894.
(Non-Patent Document 5) M. K. Debe, S. M. Hendricks, G. D. Vernstrom, M. Meyers, M. Brostrom, M. Stephens, Q. Chan, J. Willey, M. Hamden, C. K. Mittelsteadt, C. B. Capuano, K. E. Ayers, E. B. Anderson, J. Electrochem. Soc. 159 (2012) K165.
(Non-Patent Document 6) H.-S. Oh, H. N. Nong, T. Reier, M. Gliech, P. Strasser, Chem. Sci. 6 (2015) 3321-3328.
(Non-Patent Document 7) P. Lettenmeier, L. Wang, U. Golla-Schindler, P. Gazdzicki, N. A. Canas, M. Handl, R. Hiesgen, S. S. Hosseiny, A. S. Gago, K. A. Friedrich, Angewandte Chemie 55 (2016) 742-746
(Non-Patent Document 8) S. Siracusano, N. Van Dijk, E. Payne-Johnson, V. Baglio, A. S. Arico, Appl. Catal., B 164 (2015) 488-495.
(Non-Patent Document 9) A. Skulimowska, M. Dupont, M. Zaton, S. Sunde, L. Merlo, D. J. Jones, J. Roziere, Int. J. Hydrogen Energy 39 (2014) 6307-6316.
(Non-Patent Document 10) A. Marshall, S. Sunde, M. Tsypkin, R. Tunold, Int. J. Hydrogen Energy 32 (2007) 2320-2324.

SUMMARY

In an aspect, the present disclosure is directed to providing a method of preparing a membrane electrode assembly for a proton exchange membrane water electrolyzer, which may enlarge an electrolyte/electrode interface.

In another aspect, the present disclosure is directed to providing a membrane electrode assembly for a proton exchange membrane water electrolyzer, which is prepared according to the preparing method.

In an aspect, the present disclosure provides a membrane electrode assembly for a proton exchange membrane water electrolyzer, including: an oxygen electrode including an iridium oxide (IrO$_2$) layer which is an electrodeposited oxygen electrode catalyst layer on a titanium (Ti) layer which is a diffusion layer; a hydrogen electrode in which a hydrogen electrode catalyst layer is formed on a diffusion layer; and an electrolyte membrane placed between the oxygen electrode catalyst layer and the hydrogen electrode catalyst layer, in which a portion of the pores of the Ti diffusion layer are filled with an electrolyte of the electrolyte membrane.

In an exemplary embodiment, the Ti layer may be divided into an upper zone and a lower zone, the pore of the upper zone of the Ti layer may be filled with an electrolyte of the electrolyte membrane, and the pore of the lower zone of the Ti layer may not be filled with the electrolyte of the electrolyte membrane.

In another exemplary embodiment, the upper zone of the Ti layer may have a thickness of 20 to 40 µm, or 25 to 35 µm.

In another exemplary embodiment, the IrO$_2$ layer may include iridium oxide loaded at 0.01 to 1.05 mg/cm$^2$ onto the Ti layer.

In another aspect, the present disclosure provides a proton exchange membrane water electrolyzer including the membrane electrode assembly for the proton exchange membrane water electrolyzer.

In still another aspect, the present disclosure provides a method of preparing a membrane electrode assembly for a proton exchange membrane water electrolyzer, the method including: preparing an oxygen electrode including a titanium (Ti) layer which is a diffusion layer and an IrO$_2$ layer which is an oxygen electrode catalyst layer by electrodeposition of iridium oxide (IrO$_2$) onto the Ti layer to form the IrO$_2$ layer; stacking an electrolyte membrane onto the IrO$_2$ layer of the oxygen electrode; forming an oxygen electrode-electrolyte membrane assembly by performing a compression process on the oxygen electrode and the electrolyte membrane; and preparing the membrane electrode assembly by assembling a hydrogen electrode in which a hydrogen electrode catalyst layer is formed on a diffusion layer with one surface of the exposed electrolyte membrane after the compression process.

In an exemplary embodiment, the Ti layer of the oxygen electrode may include a plurality of pores, and a portion of the pores of the Ti layer of the oxygen electrode of the membrane electrode assembly may be filled with an electrolyte of the electrolyte membrane.

In another exemplary embodiment, the Ti layer may be divided into an upper zone and a lower zone, the pore of the upper zone of the Ti layer may be filled with an electrolyte of the electrolyte membrane, and the pore of the lower zone of the Ti layer may not be filled with the electrolyte of the electrolyte membrane.

In another exemplary embodiment, the upper zone of the Ti layer may have a thickness of 20 to 40 μm or 25 to 35 μm.

In another exemplary embodiment, the compression process may be performed under a temperature condition of 120 to 160° C. for 1 min to 5 min.

In another exemplary embodiment, the compression process may be performed under a pressure condition of 4 to 20 MPa.

In another exemplary embodiment, the Ti layer may be titanium mesh or titanium paper.

In another exemplary embodiment, a process of electrodepositing $IrO_2$ may be performed under a deposition potential condition of 0.5 to 0.9 $V_{SCE}$ for 1 min to 10 min.

In another exemplary embodiment, the $IrO_2$ layer may include $IrO_2$ loaded at 0.01 to 1.05 $mg/cm^2$ onto the Ti layer.

In another exemplary embodiment, prior to electrodeposition of $IrO_2$, the titanium layer may be immersed into oxalic acid, and then rinsed with de-ionized water.

According to the method of preparing a membrane electrode assembly for a proton exchange membrane water electrolyzer according to an exemplary embodiment of the present disclosure, after an $IrO_2$/Ti layer electrode including an $IrO_2$ layer electrodeposited on a Ti layer is prepared, an electrolyte membrane is stacked, and then a compression process is performed. In this case, an electrolyte penetrates into the $IrO_2$/Ti layer electrode, so that the pore of the Ti layer may be partially filled with the electrolyte, and therefore, the electrolyte/electrode interface may be enlarged. Therefore, a film-type electrode having excellent performance may be prepared as compared to a particle-type electrode in the related art, and an excellent proton exchange membrane water electrolyzer may be prepared.

DETAILED DESCRIPTION

Figure 1A:
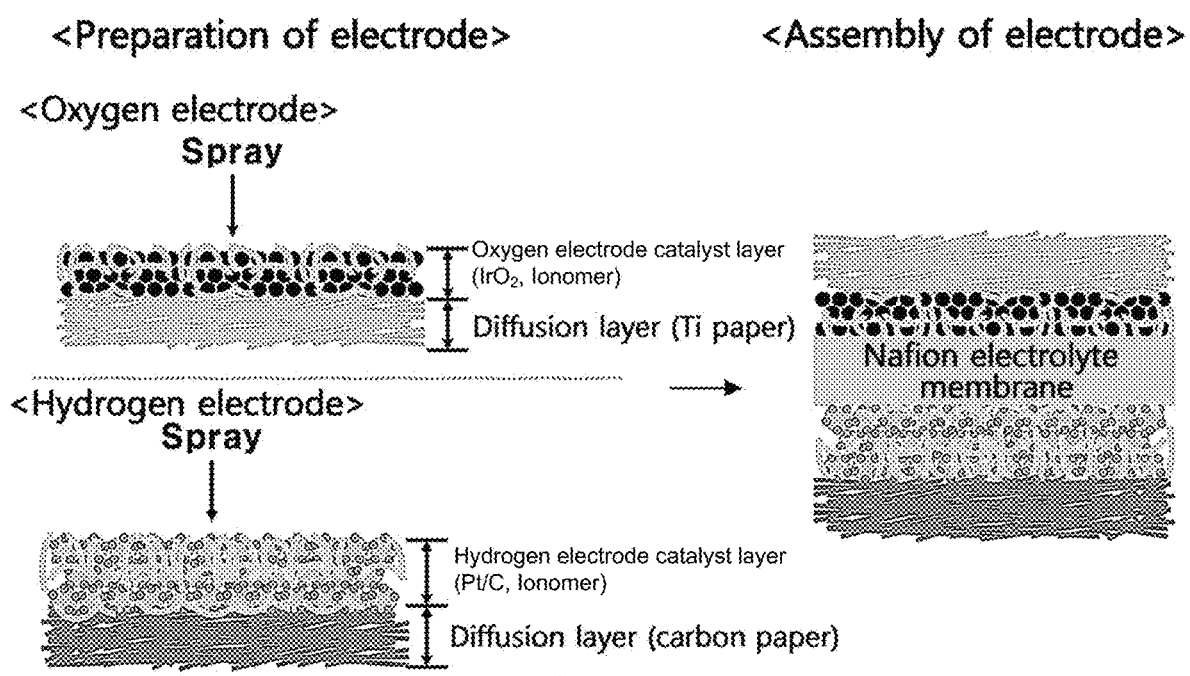
FIGS. 1A to 1D are a schematic view showing a process of preparing a membrane electrode assembly according to an electrode in the related art.
Figure 1B:
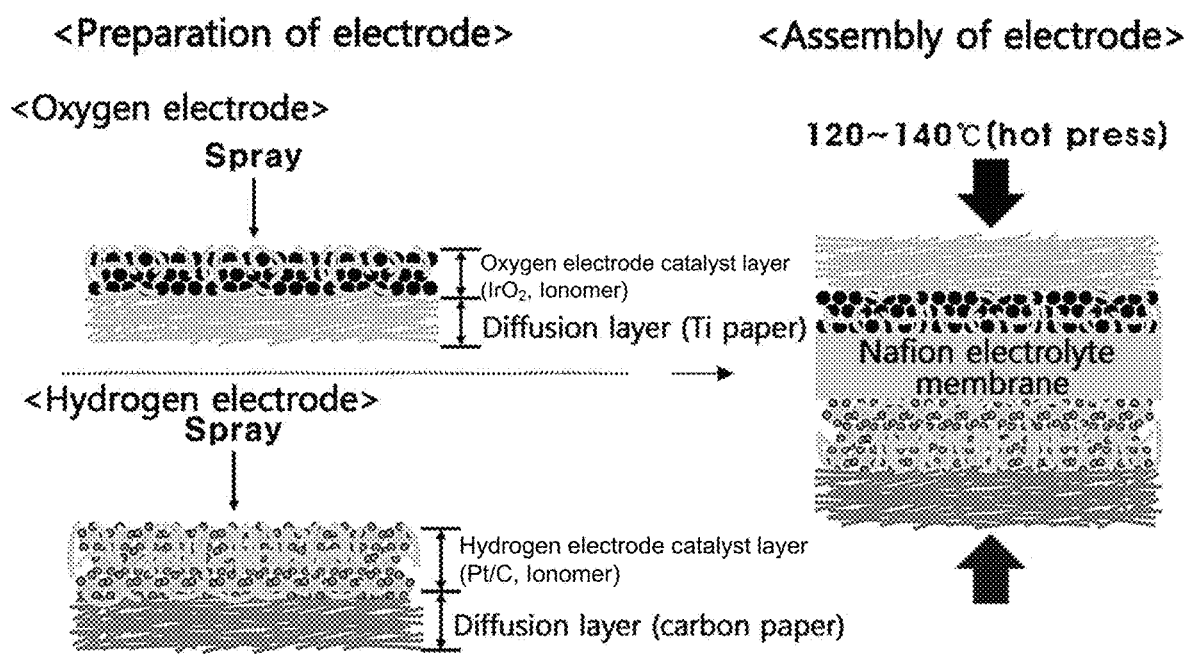
Figure 1C:
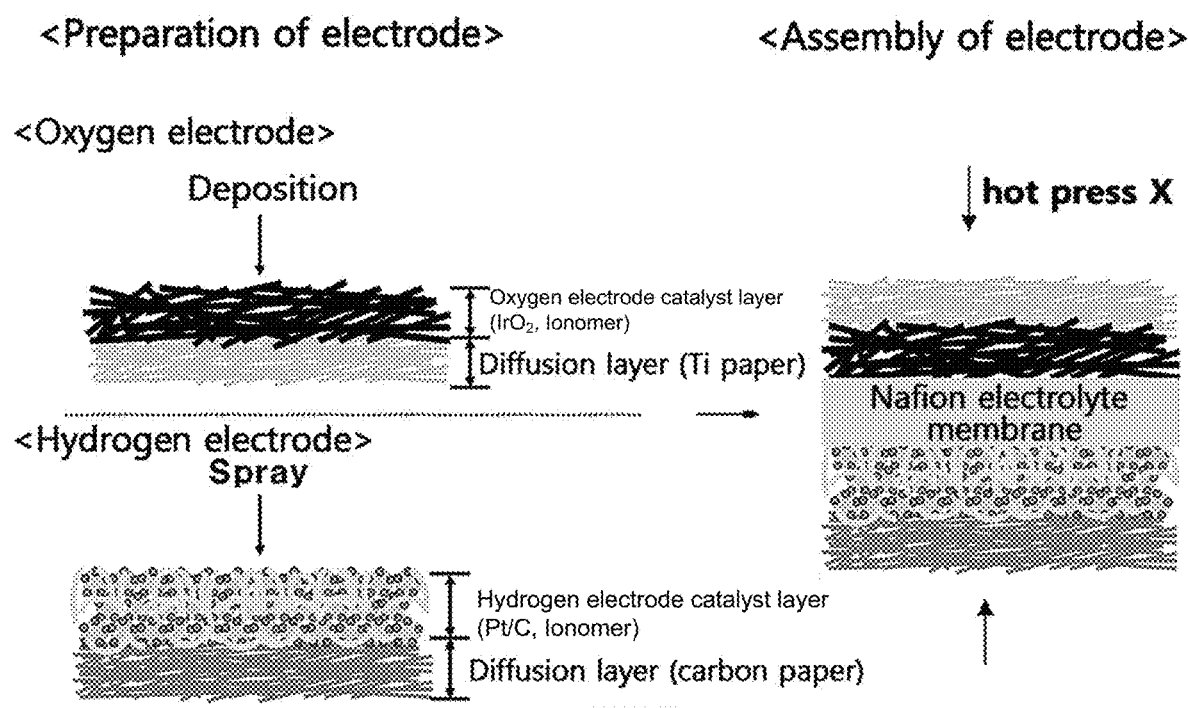

Hereinafter, preferred embodiments of the present disclosure will be described in detail with reference to the accompanying drawings.

The Examples of the present disclosure disclosed herein are exemplified for the purpose of describing the Examples of the present disclosure only, and the Examples of the present disclosure may be carried out in various forms and should not be construed to be limited by the Examples described herein.

Since the present disclosure may have various changes and different forms, it should be understood that the Examples are not intended to limit the present disclosure to specific disclosure forms and they include all the changes, equivalents and replacements included in the spirit and technical scope of the present disclosure.

Definition of Terms

In the present specification, the term 'titanium paper' refers to a substrate in the form of paper formed by closely weaving cylindrical or polygonal drum-like titanium (Ti) fiber. The titanium fiber may have a cross-sectional area of 50 to 10,000 $\mu m^2$.

In the present specification, the 'oxygen electrode' is used as a term referring to an electrode which is the same as 'anode', and the 'hydrogen electrode' is used as a term referring to an electrode which is the same as 'cathode'.

Membrane Electrode Assembly for Proton Exchange Membrane Water Electrolyzer and Proton Exchange Membrane Water Electrolyzer An exemplary embodiment of the present disclosure provides a membrane electrode assembly for a proton exchange membrane water electrolyzer. The membrane electrode assembly for the proton exchange membrane water electrolyzer includes: an oxygen electrode including an iridium oxide ($IrO_2$) layer which is an electrodeposited oxygen electrode catalyst layer on a titanium (Ti) layer which is a diffusion layer; a hydrogen electrode in which a hydrogen electrode catalyst layer is formed on a diffusion layer; and an electrolyte membrane placed between the oxygen electrode catalyst layer and the hydrogen electrode catalyst layer, and a portion of pores of the Ti diffusion layer may be filled with an electrolyte of the electrolyte membrane.

Specifically, the oxygen electrode includes a Ti layer as a diffusion layer.

Herein, the Ti layer is a porous Ti layer, and may include titanium mesh or titanium paper (TP). In an exemplary embodiment, the use of titanium paper may be preferred because the area ratio of Ti exposed per unit volume is high, and a short circuit is less likely to occur in a hot press procedure.

Meanwhile, the Ti layer may include a plurality of pores, and the Ti layer may have a porosity of about 50% to about 80%, preferably about 60% to about 70%.

In an exemplary embodiment, the Ti layer may have a thickness of 60 to 500 μm. When the Ti layer has a thickness of less than 60 μm, the pore of titanium paper is blocked after a compression process, and as a result, the performance may deteriorate, and when the Ti layer has a thickness of more than 500 μm, the mass transfer route of water is lengthened, and as a result, the performance may deteriorate.

Meanwhile, a portion of the pores of the Ti layer may filled with an electrolyte of an electrolyte membrane placed between oxygen electrode catalyst layer and hydrogen electrode catalyst layer, and this is because the electrolyte of the electrolyte membrane penetrates into an upper zone of the Ti layer when a compression process is performed on the oxygen electrode and the electrolyte membrane. In this case, the electrolyte/electrode interface may be enlarged, and the performance of a proton exchange membrane water electrolyzer including the same may be excellent compared to that of a particle-type electrode in the related art.

Meanwhile, a portion of the pores of the lower portion of the Ti layer may not be filled with the electrolyte of the electrolyte membrane, and for example, when the Ti layer is divided into an upper zone and a lower zone, the pore of the upper zone of the Ti layer may be filled with the electrolyte of the electrolyte membrane, and the pore of the lower zone may not be filled with the electrolyte of the electrolyte membrane.

In an exemplary embodiment, the Ti layer may be a Ti layer which is immersed into oxalic acid, and then rinsed with de-ionized water, and in this case, a natural oxide film on the surface of the Ti layer may be removed, and $IrO_2$ may be uniformly impregnated on the entire surface, and as a result, the performance may be further enhanced.

Meanwhile, the $IrO_2$ layer may function as an oxygen electrode catalyst layer (i.e., oxygen electrode catalyst layer). The $IrO_2$ layer is electrodeposited, and has an inherent property (or morphology) and structure of electrodeposition, which is differentiated from a case where another preparation method (for example, a spraying method or a decal method, and the like) for forming $IrO_2$ on the corresponding Ti layer is used.

In an exemplary embodiment, the $IrO_2$ layer covers the surface of the titanium layer, and it is preferred that the $IrO_2$ layer has a crack-free structure.

Meanwhile, in the present disclosure, the $IrO_2$ layer may exhibit an effect which is the same as or more improved than that of an existing anode even though a small amount of $IrO_2$ is loaded onto the Ti layer. For example, even though $IrO_2$ at 0.01 to 1.05 mg/cm$^2$, specifically, 0.075 to 0.2 mg/cm$^2$ is loaded onto the Ti layer, it is possible to exhibit an effect which is improved as compared to that of an existing proton exchange membrane water electrolyzer.

Meanwhile, still another exemplary embodiment of the present disclosure provides a proton exchange membrane electrolyzer including the membrane electrode assembly for the proton exchange membrane water electrolyzer.

In the present disclosure as aforementioned, an oxygen electrode including the $IrO_2$/Ti layer is prepared, and then a one-side compression process is performed by using an electrolyte membrane. Therefore, the pore of $IrO_2$/Ti layer may be partially filled with an electrolyte of the electrolyte membrane by allowing the electrolyte of the electrolyte membrane to penetrate into the Ti layer of the oxygen electrode. The average thickness of zone where the pore of the Ti layer is filled affects an active area, and within an optimal thickness range, the cell voltage required at 1.0 A/cm$^2$ and 80° C. may be reduced from 1.78 V to 1.64 V. This is a value which is comparable to those when a PGM-based catalyst is loaded (for example, 1 to 3 mg). Therefore, the proton exchange membrane water electrolyzer may be widely used for water electrolyzers.

Figure 2:
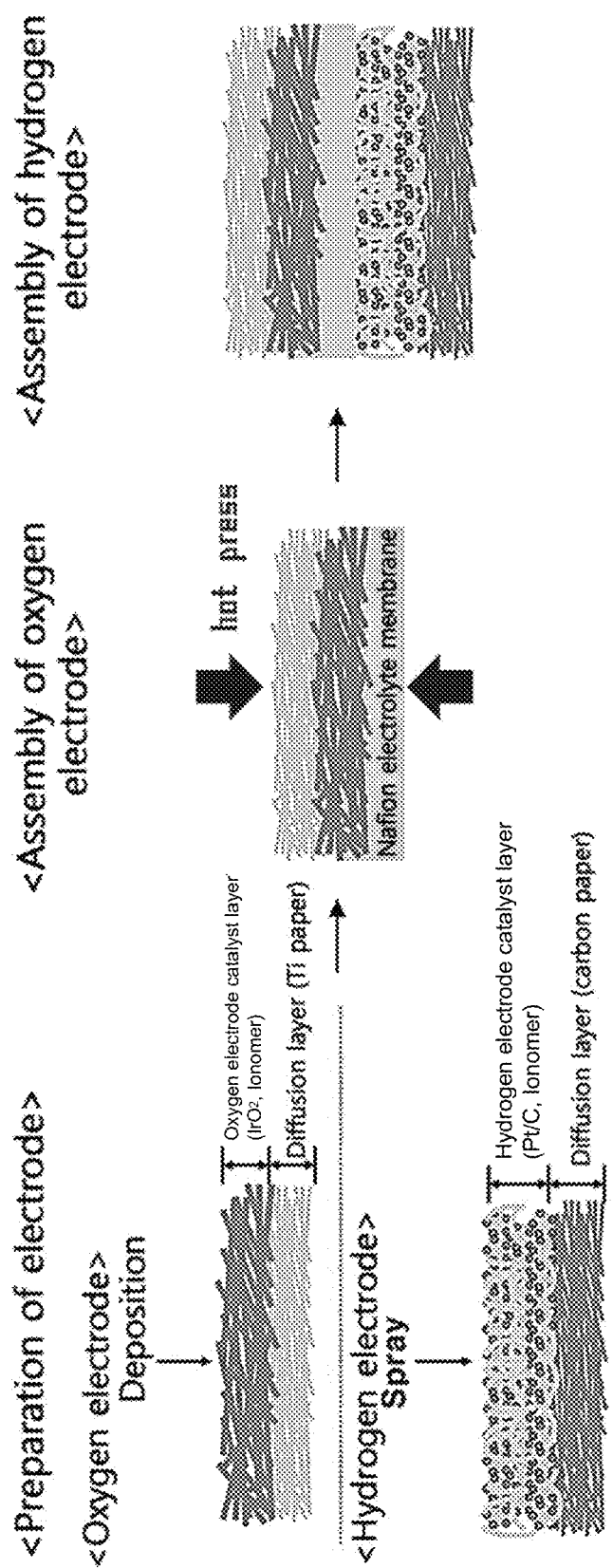
FIG. 2 is a schematic view showing a process of preparing a membrane electrode assembly according to the present disclosure.

Method of Preparing Membrane Electrode Assembly for Proton Exchange Membrane Water Electrolyzer In an exemplary embodiment, the present disclosure provides a method of preparing a membrane electrode assembly for a proton exchange membrane water electrolyzer, the method including: preparing an oxygen electrode including a titanium (Ti) layer which is a diffusion layer and an $IrO_2$ layer which is an oxygen electrode catalyst layer by electrodeposition of iridium oxide ($IrO_2$) onto the Ti layer to form the $IrO_2$ layer; stacking an electrolyte membrane onto the $IrO_2$ layer of the oxygen electrode; forming an oxygen electrode-electrolyte membrane assembly by performing a compression process on the oxygen electrode and the electrolyte membrane; and preparing the membrane electrode assembly by assembling a hydrogen electrode with one surface of the exposed electrolyte membrane after the compression process. FIG. 2 schematically describes the corresponding preparing method. Hereinafter, the present disclosure will be described in detail for each step.

First, an oxygen electrode including a Ti layer and an $IrO_2$ layer is prepared by electrodepositing iridium oxide ($IrO_2$) on a titanium (Ti) layer to form the $IrO_2$ layer. The Ti layer may function as a diffusion layer, and the $IrO_2$ layer may function as an electrode catalyst layer.

In an exemplary embodiment, the Ti layer is not limited, but may include titanium mesh or titanium paper. However, titanium paper may be preferred because the area ratio of Ti exposed per unit volume is high, and a short circuit is less likely to occur in a hot press procedure.

Meanwhile, the Ti layer is a porous Ti layer, and may include a plurality of pores. In an aspect, the porous Ti layer may have a porosity of about 50% to about 80%, preferably about 60% to about 70%.

In an exemplary embodiment, the Ti layer may have a thickness of 60 to 500 μm. When the Ti layer has a thickness of less than 60 μm, the pore of titanium paper is blocked after a compression process, and as a result, the performance may deteriorate, and when the Ti layer has a thickness of more than 500 μm, the mass transfer route of water is lengthened, and as a result, the performance may deteriorate.

In an exemplary embodiment, a process of immersing the Ti layer into oxalic acid, and then rinsing the Ti layer with ionized water may be further performed before $IrO_2$ is electrodeposited, and in this case, a natural oxide film on the surface of the Ti layer may be removed, and $IrO_2$ may be uniformly impregnated on the entire surface.

Meanwhile, in the present disclosure, when an iridium oxide ($IrO_2$) layer is electrodeposited, the iridium oxide ($IrO_2$) layer has an inherent property (or morphology) and structure of electrodeposit, which is differentiated from a case where another preparation method (for example, a spraying method or a decal method, and the like) for forming IrO$_2$ on the corresponding Ti layer having a mesh shape is used. That is, when an IrO$_2$ layer is formed on a Ti layer by electrodeposition, while IrO$_2$ particles (for example, spherical particles) begin to be formed, the IrO$_2$ particles are produced on the surface of the Ti layer and grown in the form of a film, and as a result, the surface of the Ti layer is covered (that is, surface-covered) with an IrO$_2$ layer (or may also be expressed as an IrO$_2$ film), and the surface of the Ti layer has a form (structure) in which IrO$_2$ particles further formed as the deposition time passes are attached (or deposited) onto the corresponding IrO$_2$ layer.

In an exemplary embodiment, the IrO$_2$ layer covers the surface of the Ti layer, and it is preferred that the IrO$_2$ layer has a crack-free structure.

In an aspect, the IrO$_2$ layer may cover the surface of titanium paper.

Meanwhile, in the present disclosure, the IrO$_2$ layer may exhibit an effect which is the same as or more improved than that of an existing anode even though a small amount of IrO$_2$ is loaded onto the Ti layer. For example, even though IrO$_2$ at 0.01 to 1.05 mg/cm$^2$, specifically, 0.075 to 0.2 mg/cm$^2$ is loaded onto the Ti layer, it is possible to exhibit an effect which is improved as compared to that of an existing proton exchange membrane water electrolyzer.

Meanwhile, in an exemplary embodiment, the electrodeposition process may be proceeded under a deposition potential condition of 0.5 to 0.9 V$_{SCE}$, more specifically, 0.6 to 0.9 V$_{SCE}$. When the electrodeposition is performed at less than 0.5 V$_{SCE}$, cracks may be produced on the IrO$_2$ layer, and when the electrodeposition is performed at more than 0.9 V$_{SCE}$, the deposition efficiency is not excellent, and as a result, the range may not be preferred in terms of economic efficiency.

In an exemplary embodiment, the electrodeposition may be performed for 1 min or more and less than 20 min, specifically, 5 min or more and 15 min or less. When the electrodeposition is performed for less than 1 min, the IrO$_2$ layer may not completely cover the Ti layer, and when the electrodeposition is performed for more than 10 min, cracks may be produced on the IrO$_2$ layer.

Thereafter, an electrolyte membrane may be stacked on the IrO$_2$ layer of the oxygen electrode.

In an exemplary embodiment, as the electrolyte membrane, for example, nafion, polybenzimidazole (PBI), Aquivion, or a polymer membrane thereof, and the like may be used. Further, when the electrolyte membrane is stacked, the electrolyte membrane may be stacked by using a typical technology which is not limited.

Subsequently, an oxygen electrode-electrolyte membrane assembly is formed by performing a compression process on the oxygen electrode and the electrolyte membrane. Through the compression process, pressure is applied on the oxygen electrode and the electrolyte membrane, and as a result, the oxygen electrode and the electrolyte membrane may be compressed.

When a compression process is performed on the oxygen electrode and the electrolyte membrane, the pore of the Ti layer may be partially filled with an electrolyte of the electrolyte membrane. Accordingly, the interface between electrode and electrolyte may be enlarged, and an additional interface between electrode and electrolyte may be provided.

In an exemplary embodiment, the compression process may be performed under a temperature condition of 120 to 160° C. for 1 min to 5 min, and may be specifically performed under a temperature condition of 135 to 150° C. for 2 min to 4 min. When the temperature condition is out of the range, the penetration depth of the electrolyte of the electrolyte membrane into the pore of the Ti layer of the oxygen electrode becomes extremely small or large, so that the performance may not be sufficiently improved.

In an exemplary embodiment, the compression process may be performed under a pressure condition of 4 to 20 MPa. The higher the pressure is, the larger the number of pores of the Ti layer of the oxygen electrode to be filled with an electrolyte of the electrolyte membrane is, and thus the active area may be increased, but when the pore is filled with the electrolyte as described above, the number of reaction sites with which water, which is a raw material for a proton exchange membrane water electrolyzer, may be reacted is decreased, so that only the pore of an upper zone adjacent to IrO$_2$ in the Ti layer of the oxygen electrode is filled with the electrolyte of the electrolyte membrane.

In an exemplary embodiment, the compression process may be performed under a pressure condition of 5 to 10 MPa.

In an exemplary embodiment, the compression process may be a hot press process.

Through the compression process, a portion of the pores of the Ti layer may be filled with the electrolyte of the electrolyte membrane. For example, the Ti layer is divided into an upper zone and a lower zone, and herein, the pore of the upper zone of the Ti layer may be filled with the electrolyte of the electrolyte membrane, whereas the pore of the lower zone of the Ti layer may not be filled with the electrolyte of the electrolyte membrane.

In this case, the upper zone of the Ti layer may have a thickness (vertical) of 20 to 40 jam, for example, a thickness of 25 to 35 µm.

When the upper zone of the Ti layer has a thickness of less than 20 µm, the interface between electrode and electrolyte is enlarged, and as a result, an effect in which the 3-phase boundary is enlarged may be slight, and when the upper zone of the Ti layer has a thickness of more than 40 µm, the number of reaction sites with which water, which is a raw material for a proton exchange membrane water electrolyzer, may be reacted is decreased, and as a result, the performance of the electrolyzer may deteriorate.

Thereafter, a membrane electrode assembly is prepared by preparing a hydrogen electrode, and then assembling the hydrogen electrode with one surface of the exposed electrolyte membrane. In an exemplary embodiment, the hydrogen electrode may also include a diffusion layer and a hydrogen electrode catalyst layer (i.e., hydrogen electrode catalyst layer) formed on the diffusion layer. In an example, the hydrogen electrode may be prepared so as to have a configuration of Pt/C.

Figure 1D:
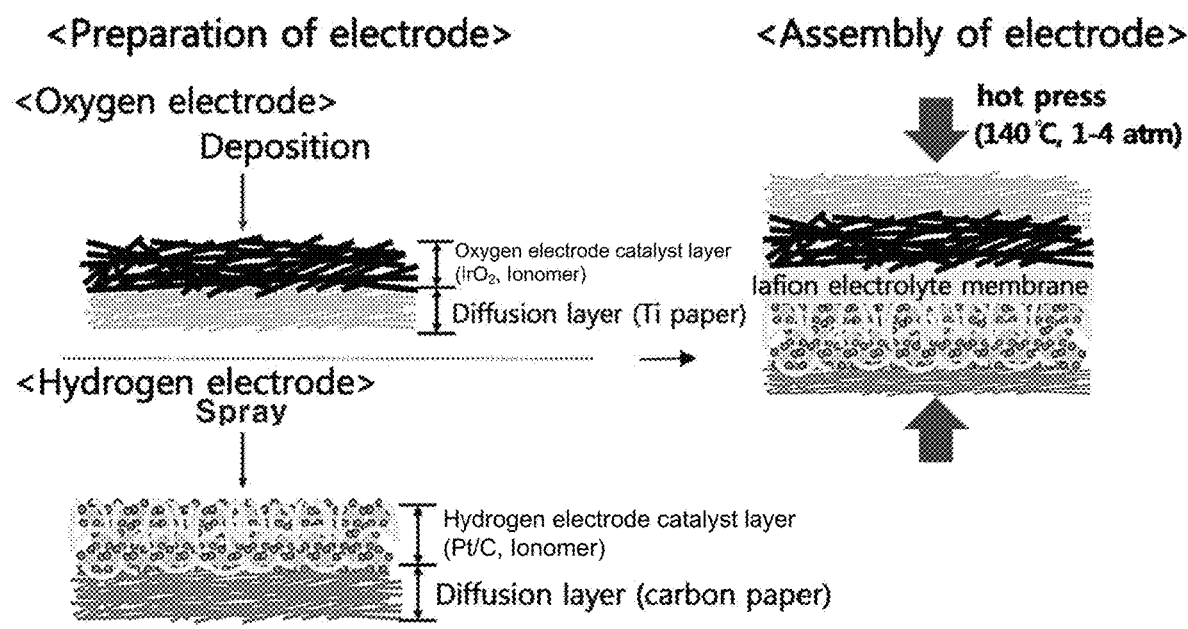

Meanwhile, the hydrogen electrode needs to be assembled with an electrolyte membrane after the above-described compression process, and the reason is because a carbon material for a hydrogen electrode may be damaged when a hydrogen electrode and an oxygen electrode are placed with an electrolyte membrane therebetween, and then a compression process is performed as in FIG. 1D.

In the present disclosure as described above, an oxygen electrode including the IrO$_2$/Ti layer is prepared, and then a one-side compression process is performed by using an electrolyte membrane. Therefore, the pore of IrO$_2$/Ti layer may be partially filled with an electrolyte by allowing the membrane electrolyte to penetrate into the Ti layer of the oxygen electrode. The average thickness of zone where the pore of the Ti layer is filled affects an active area, and within an optimal thickness range, the cell voltage required at 1.0 A/cm$^2$ and 80° C. may be reduced from 1.78 V to 1.64 V. Therefore, the proton exchange membrane water electrolyzer may be widely used for water electrolyzers.

Hereinafter, the present disclosure will be described in more detail through Examples. These Examples are only for exemplifying the present disclosure, and it will be obvious to those skilled in the art that the scope of the present disclosure is not interpreted to be limited by these Examples.

EXAMPLES

Preparation Examples

Preparation of IrO$_2$/TP

After a bath including an electrodeposition solution consisting of 10 mM iridium chloride hydrate (IrCi$_4$.H$_2$O), 100 mM hydrogen peroxide (H$_2$O$_2$), 40 mM oxalic acid (COOH$_2$.2H$_2$O), and 340 mM potassium carbonate (KCO$_3$) was prepared, IrO$_2$ catalyst was anodically electrodeposited. The bath was aged at least 3 days after electrodeposition for stabilization of Ir complex. Titanium paper (berkit, ST/Ti/20/450/60) with an active area of 6.25 cm$^2$ was used as a working electrode, while Ti mesh and standard calomel electrode (SCE) were employed as counter and reference electrodes, respectively. Prior to electrodeposition, the working electrode was immersed into 5 wt % oxalic acid at 60° C. for 30 min and then rinsed with pure D.I. water. After then, the working electrode was transferred to a teflon cell, and potential of 0.7 V$_{SCE}$ was constantly applied for 10 min in room temperature.

Preparation of IrO$_2$/CP

For comparison, IrO$_2$ was electrodeposited on carbon paper with the same experimental conditions as in the preparation of IrO$_2$/TP.

Preparation of HP—IrO$_2$/TP

As described above, IrO$_2$/TP was prepared by electrodepositing IrO$_2$ onto TP. After then, HP—IrO$_2$/TP (HP—IrO$_2$/TP is denoted as P2 in FIG. 5A) was prepared by subjecting the electrolyte membrane and the oxygen electrode to hot press at 140° C. and 4 to 20 MPa for 2 min.

Furthermore, in the following Example, HP—IrO$_2$/TP was prepared by varying the pressure conditions during the hot press process. Among them, the case where pressure was adjusted to 4 MPa, 8 MPa, and 20 MPa was expressed as HP—IrO$_2$/TP@4 MPa, HP—IrO$_2$/TP@8 MPa, and HP—IrO$_2$/TP@20 MPa, respectively.

Figure 3:
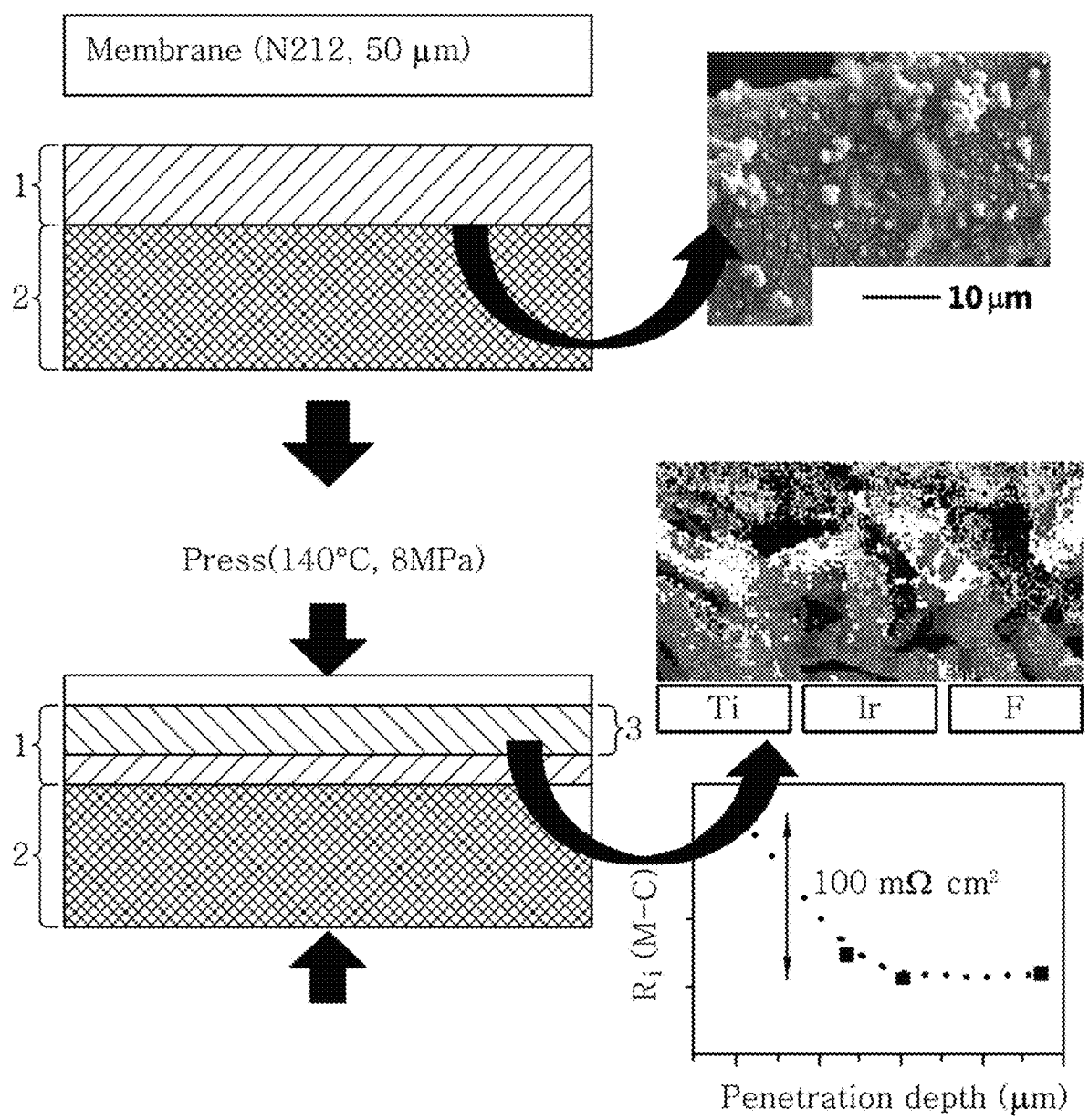
FIG. 3 shows a result comparing the surfaces of the oxygen electrode-electrolyte membrane assembly before and after a compression (hot press) process according to the present disclosure.

FIG. 3 shows a result comparing the surfaces of the oxygen electrode-electrolyte membrane assembly before and after a compression (hot press) process.

In FIG. 3, IrO$_2$/TP are depicted to have two parts, i.e., IrO$_2$ electrodeposited TP part (1) and non-electrodeposited TP part (2). After a compression (hot press), M-E zone (3) where the pore of TP was partially filled with the membrane is formed in the IrO$_2$ electrodeposited TP part (1).

Preparation of HP'—IrO$_2$/TP

For comparison, an oxygen electrode and a hydrogen electrode were prepared, respectively, and then a nafion membrane (NR-212, Dupont) was placed in the middle thereof, and then hot-pressed. The oxygen electrode was prepared as described above, and the hydrogen electrode was prepared by spray-coating a catalyst ink composed of 46.5 wt % Pt/C (Johnson Matthey), 5 wt % nation solution, isopropyl alcohol (IPA, J. T. Baker), and deionized water on commercial carbon paper (39BC, SGL carbon). The Pt loading was 0.4 mg/cm$^2$, the nafion content was 30 wt %, and the hot press process was performed at 140° C. and 4 to 20 MPa for 2 min. Therefore, MEA including HP'—IrO$_2$/TP (HP'—IrO2/TP is denoted as P1 in FIG. 5A) was prepared.

Analysis of IrO$_2$/CP Electrode and IrO$_2$/TP Electrode Characteristics

All processes were carried out with potentiostat equipment (AUT302N, AUTO LAB Ltd.). IrO$_2$ distribution at the electrode surface and IrO$_2$ loading were examined with EPMA and inductively coupled plasma mass spectroscopy (ICP-MS) analysis, respectively.

Preparation of Membrane Electrode Assembly and PEMWE Single Cell

The above-described electrodes (IrO$_2$/CP, IrO$_2$/TP, HP—IrO$_2$/TP, and the like) and the hydrogen electrode were prepared, respectively, and then MEA was prepared. The hydrogen electrode was prepared through the same process as described above. When HP—IrO$_2$/TP was used, the MEA was prepared by placing HP—IrO$_2$/TP and the hydrogen electrode (Pt/C) onto either sides of nafion membrane (NR-212, Dupont), and then assembling the electrodes with the nafion membrane. Subsequently, a single cell for a proton exchange membrane water electrolyzer (PEWME) was prepared by loading the MEAs on a home-made single cell that is equipped with graphite (cathode) and an Au/Ti bipolar plate (anode). At this time, an exposed active area of the MEA was fixed at 6.25 cm$^2$.

Analysis of Membrane Electrode Assembly and PEMWE Single Cell Characteristics iV curves and electrochemical impedance spectroscopy (EIS) results were obtained from the potentiostat (HCP-803, biologic) combined with a power booster. The constant voltages from 1.35 V to 2.0 V were applied for 1 min each with an interval of 0.05 V. D. I. water was fed into the anode side of the cell with a flow rate of 15 mL/min. Temperatures of the ionized water and the cell were fixed at 80° C.

Results and Discussion

Review of IrO$_2$/TP and IrO$_2$/CP Electrode Characteristics

Figure 4A:
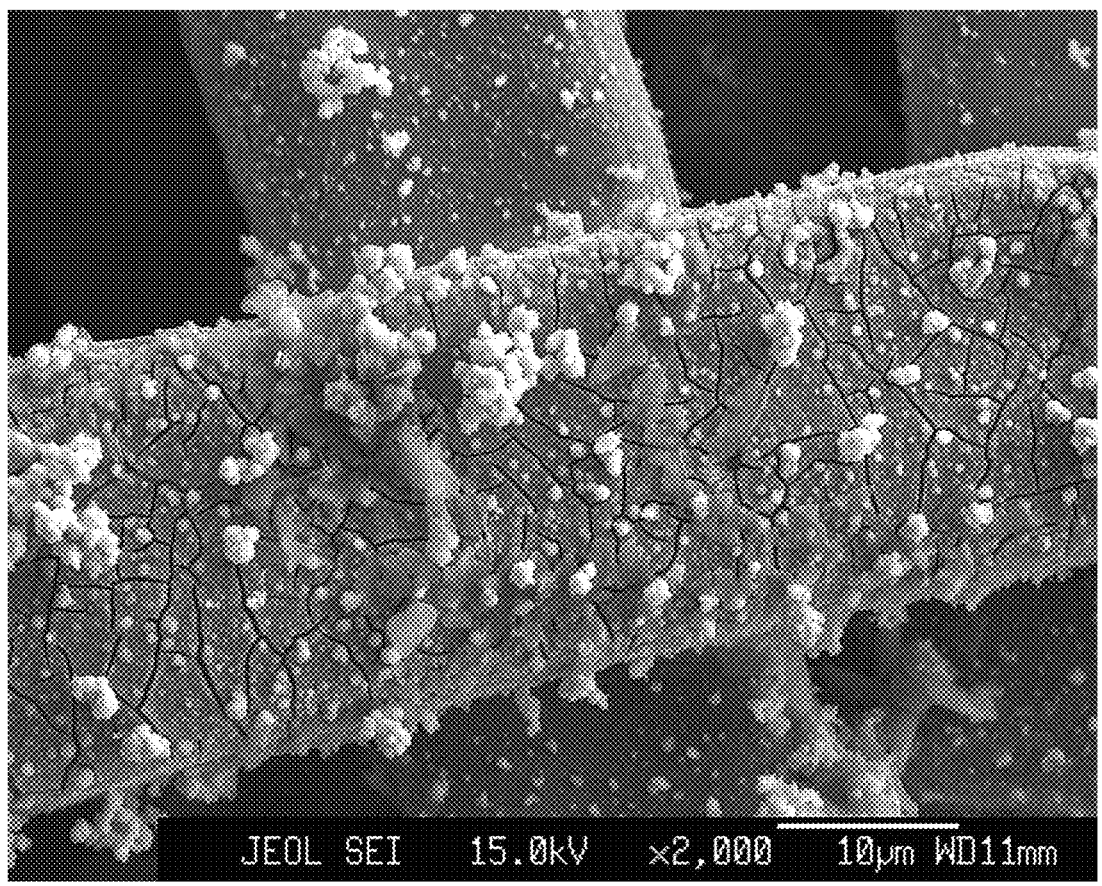
FIGS. 4A to 4C are photographs showing a surface morphology of an electrodeposited $IrO_2$ layer (FIG. 4A) and its enlarged image (FIG. 4B), and a corresponding EPMA mapping result (FIG. 4C)
Figure 4B:
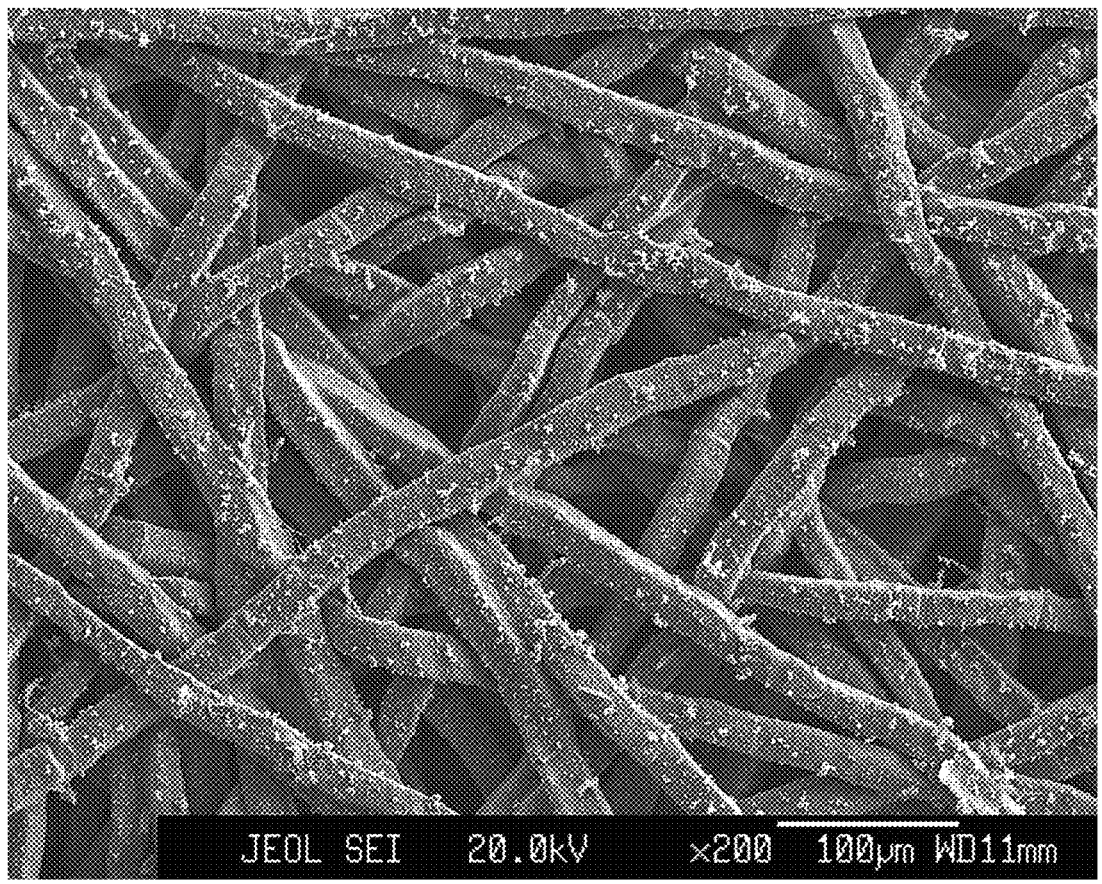
Figure 4C:
Figure 4D:
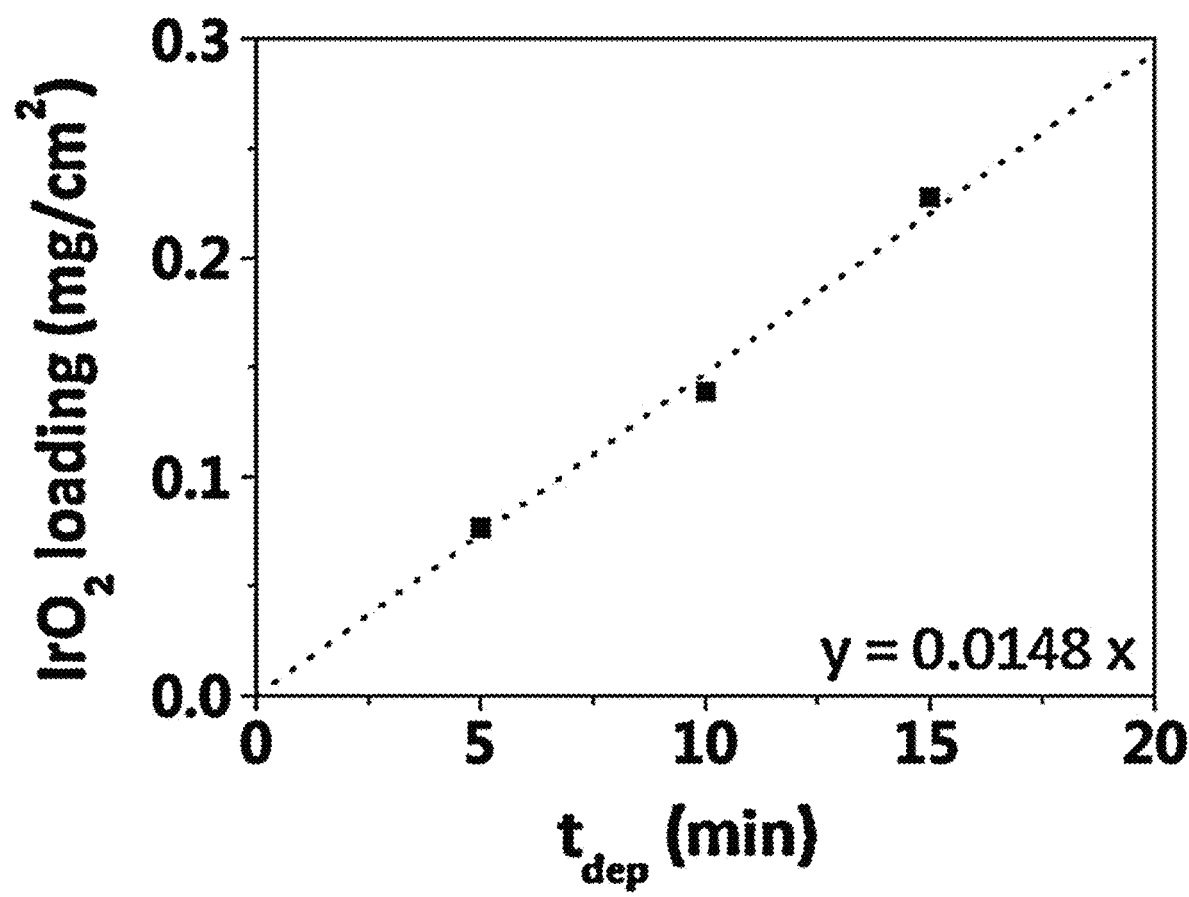
FIG. 4D is a graph showing a change in $IrO_2$ loading according to a change in $t_{dep}$ measured by ICP-MS.

The surface morphology of an IrO$_2$ film electrodeposited onto titanium paper (TP) at E$_{dep}$ of 0.7 V for 10 min is shown in FIGS. 4A to 4C. It could be confirmed that deposited IrO$_2$ was uniformly distributed without any noticeable defect or agglomeration. A magnified image showed that the IrO$_2$ particles with submicron diameter were formed on the cracked IrO$_2$ films, providing a high surface area. Such morphology is similar to electrodeposited IrO$_2$ film on carbon paper. The ICP-MS analysis results in FIG. 4D exhibited that the IrO$_2$ loading was nearly proportional to t$_{dep}$ with a slope of 0.0148 mg/cm$^2$·min. It could be confirmed that for t$_{dep}$ of 10 min, the IrO$_2$ loading reached 0.13 mg/cm$^2$, which is almost consistent with those on CP (0.1 mg/cm$^2$).

Thereafter, the performance of a water electrolyzer including the electrodes was reviewed.

Figure 5A:
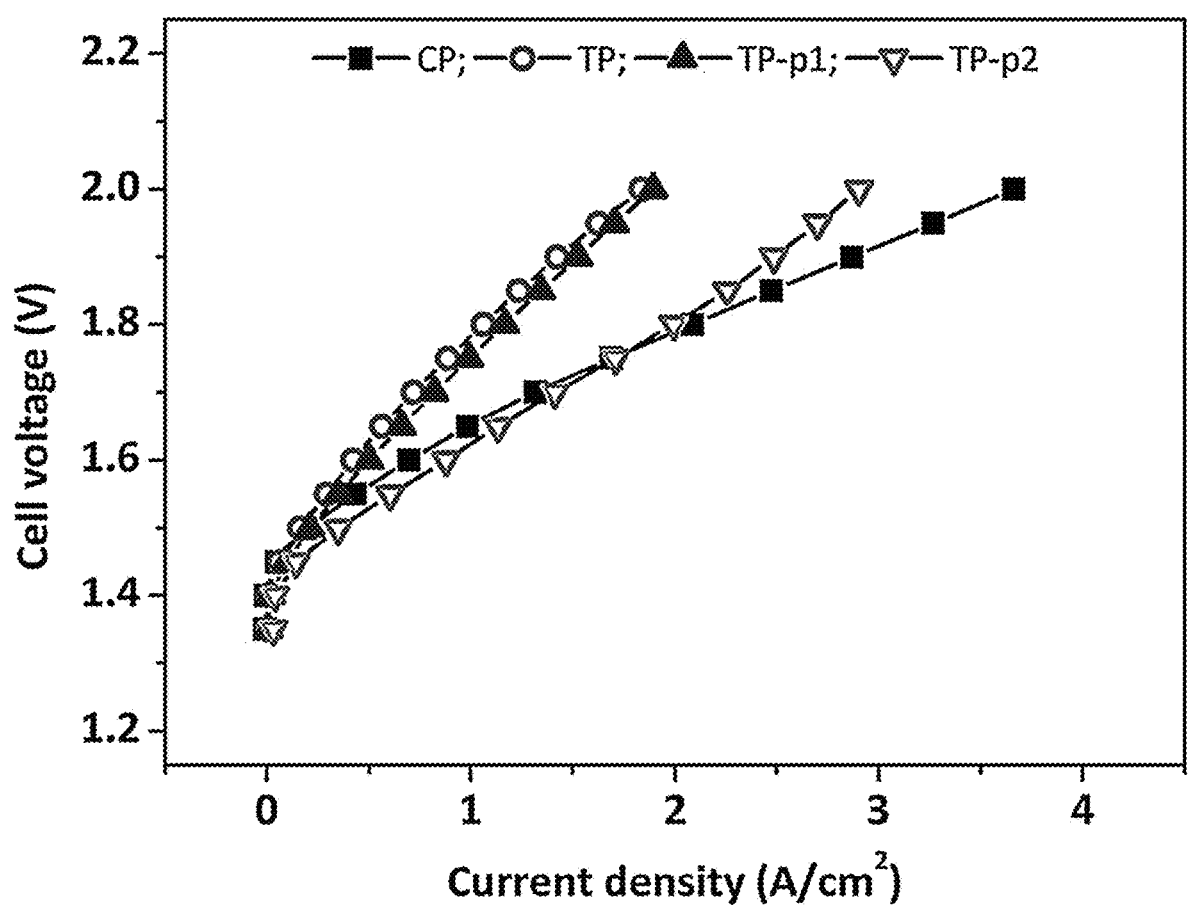
FIG. 5A shows iV curves of various electrodes ($IrO_2$/CP, $IrO_2$/TP, and membrane-oxygen electrode assemblies including $IrO_2$/TP electrodes denoted as P1 and P2)
Figure 5B:
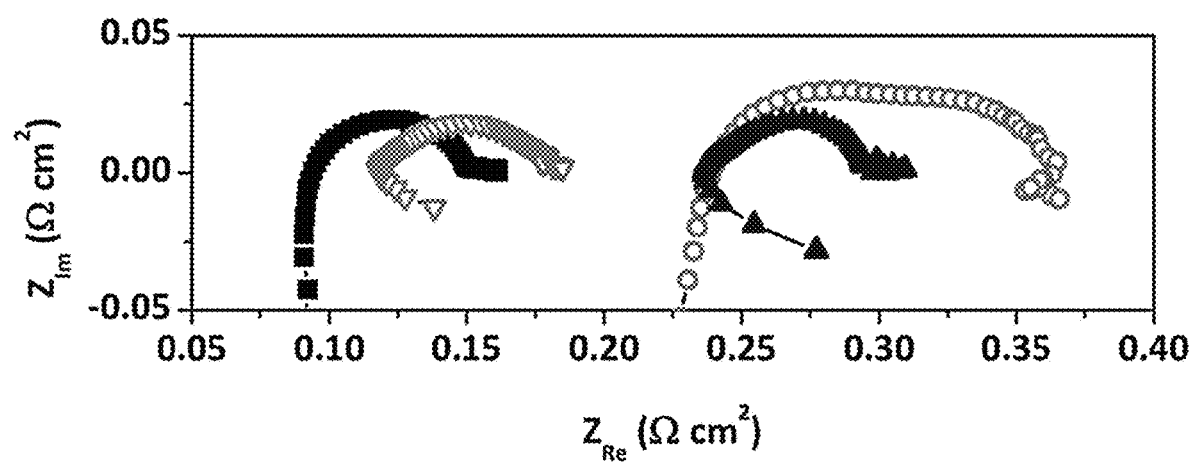
FIG. 5B shows a Nyquist plot at 1.6 V for the electrodes.

FIG. 5A shows the iV curves of IrO$_2$ electrodes (that is, IrO$_2$/CP and IrO$_2$/TP) deposited on CP and TP with E$_{dep}$ of 0.7 V for 10 min. Despite their similar IrO$_2$ loading, it could be confirmed that the IrO$_2$/TP electrode yielded lower voltage efficiency than IrO$_2$/CP for all current density (However, there is a problem in that the IrO$_2$/CP electrode could not be used because of its stability issue). The cell voltage at 1 A/cm$^2$ for IrO$_2$/TP was 1.78 V, which was 0.13 V higher than that for IrO$_2$/CP (1.65 V). EIS results at 1.6 V revealed that both higher ohmic resistance (R$_{ohm}$) as well as lower kinetics contributed to inferior performance of IrO$_2$/TP (FIG. 5B). iV curves of HP—IrO$_2$/TP and HP'—IrO$_2$/TP electrodes are also presented in FIG. 5A (in FIG. 5A, HP—IrO$_2$/TP is represented by P2 and HP'—IrO$_2$/TP is represented by P1). It could be confirmed that HP'—IrO$_2$/TP yielded an improvement in performance of electrode due to reduction of $R_{kin}$, whereas in the case of HP—IrO$_2$/TP, the compression process provides not only better kinetic but also the lower $R_{ohm}$ (FIG. 5B). The reduction of $R_{kin}$ indicated that the application of the compression process enlarged the interface between electrode and electrolyte, and thus 3-phase boundary. Enlarged interface might give lower $R_{ohm}$ as well by providing an additional interface for proton transfer, as shown in the case of HP—IrO$_2$/TP. Meanwhile, when a cathode is prepared, and then a compression process is performed as in HP'—IrO$_2$/TP, the carbon fiber structure at cathode side could be destructed, leading to an increase in $R_{ohm}$. Therefore, it could be confirmed that a method of preparing an anode, and then performing a compression process with an electrolyte membrane, and then assembling a cathode with the anode and the electrolyte membrane is the most effective way to improve the cell performance.

Figure 6:
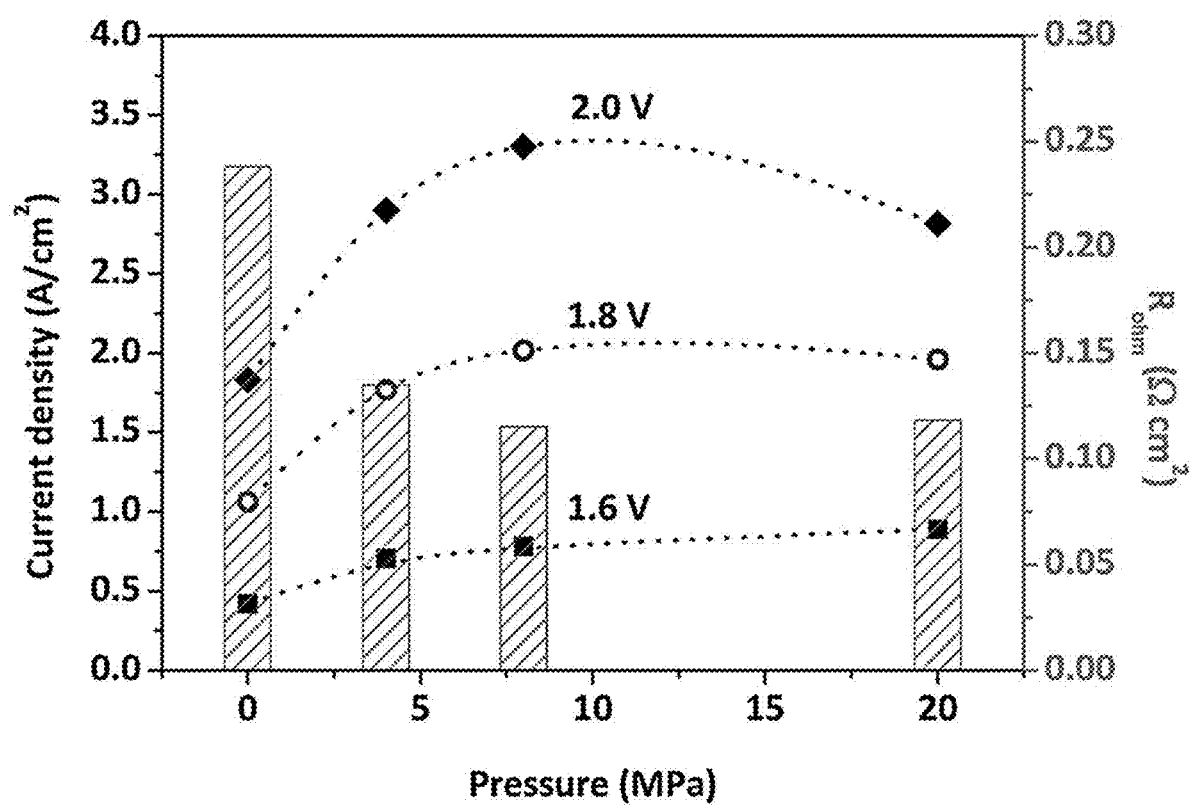
FIG. 6 shows current densities at voltages of 1.6 V, 1.8 V, and 2.0 V and a change in $R_{ohm}$ according to a change in applied voltage during a compression (hot press) process. The compression (hot press) process was proceeded as in the P2 in FIG. 5A.

Experiments were carried out by varying pressure in the compression process performed when the HP—IrO$_2$/TP was prepared, and the performance results are shown in FIG. 6. Further, the $R_{ohm}$ measured with high frequency intercept of EIS at 1.6 V is also shown in FIG. 6. When FIG. 6 is examined, $R_{ohm}$ was reduced by half (from 0.238 Ω·cm$^2$ at 0 MPa to 0.118 Ω·cm$^2$ at 20 MPa) when the applied pressure during the compression process exceeded 8 MPa. It could be confirmed that the increase in current density was observed at low voltage (1.6 V) and medium voltage (1.8 V) where the activation and ohmic losses are significant, and at high voltage (2.0 V), the highest current density was observed near 8 MPa, and the applying more pressure led to performance loss. This result implied that excessively high pressure during the compression process imposes positive impact on reaction kinetics and ohmic loss but is detrimental to mass transfer.

As shown in FIG. 6, $R_{ohm}$ may be represented by a function of anode substrate and the applied pressure during hot press, and in order to clarify its origin, $R_{ohm}$ was represented by a sum of outer cell resistance ($R_O$), membrane resistance ($R_m$), cathode resistance ($R_c$), anode resistance ($R_a$), and interfacial resistance ($R_{i,cm}$, $R_{i,am}$, $R_{i,cb}$, $R_{i,ab}$) as presented at the following [Equation 1].

$$R_{ohm} = R_O + R_m + R_{i,cm} + R_{i,am} + R_c + R_a + R_{i,cb} + R_{i,ab} \quad \text{[Equation 1]}$$

Figure 7A:
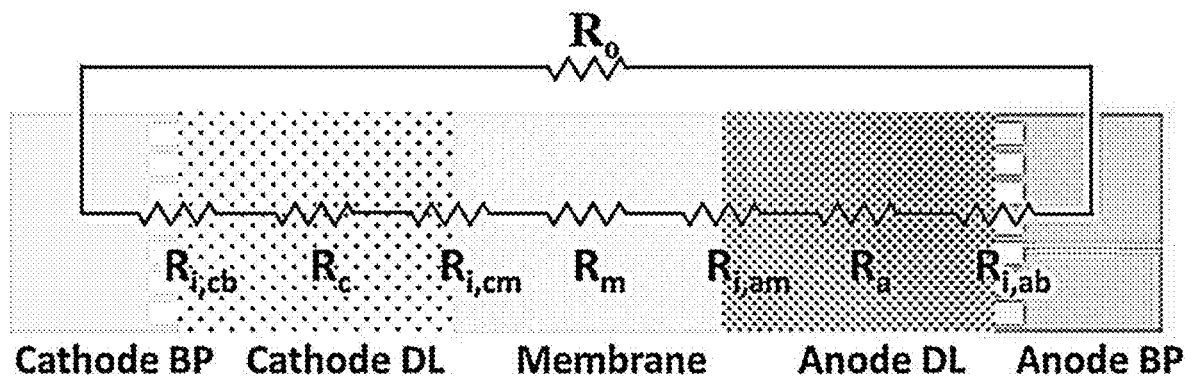
FIG. 7A shows the individual components of $R_{ohm}$ for a full cell.
Figure 7B:
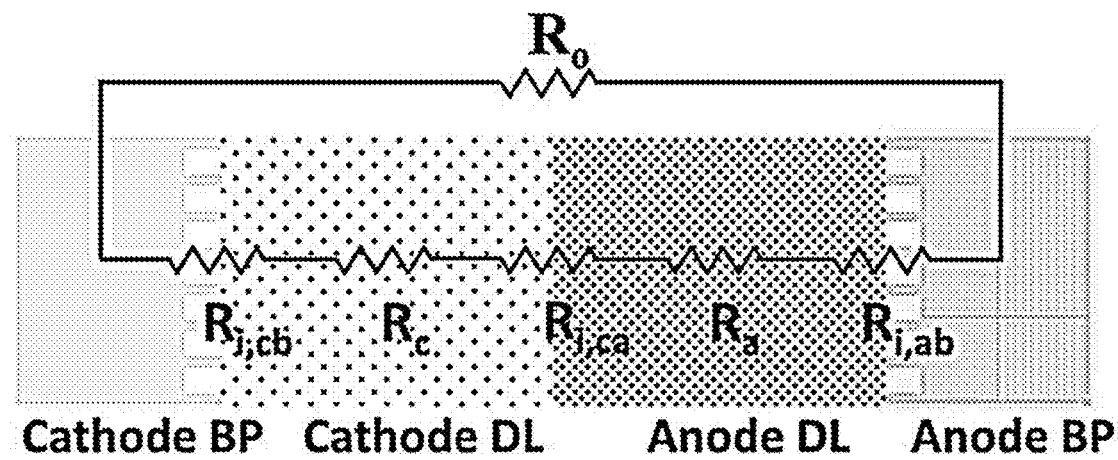
FIG. 7B shows the individual components of $R_{ohm}$ for a membrane-free cell.

FIG. 7A is a schematic view showing $R_{ohm}$ of a cell including an electrolyte membrane, and FIG. 7B is a schematic view showing $R_{ohm}$ of a membrane-free cell.

When FIG. 7B is examined, the contributions of $R_O$, $R_c$, $R_a$, $R_{i,cb}$, and $R_{i,ab}$ are roughly approximated from the $R_{ohm}$ of the membrane-free cell with assuming that $R_{i,ca}$ is negligible. Meanwhile, the $R_m$ can be calculated from conductivity of a nafion membrane in fully wetted condition at 80° C. (0.16 S/cm$^2$). Accordingly, when this is reflected, and $R_{i,cm}$ and $R_{i,am}$ are combined to represent Rim, the [Equation 1] may be represented by the following [Equation 2].

$$R_{ohm} = 0.031 \, \Omega \cdot cm^2 + R_t + R_{i,m} \quad \text{[Equation 2]}$$

Figure 7C:
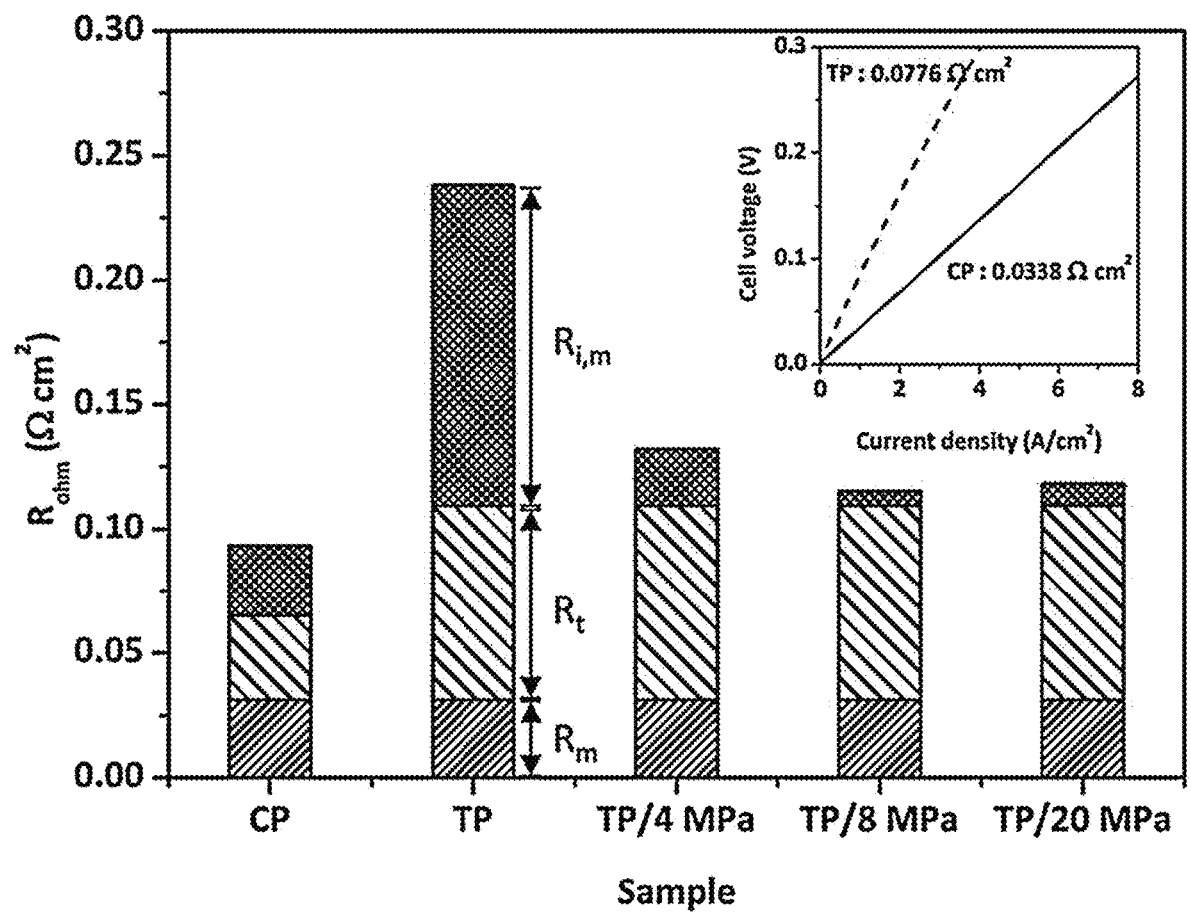
FIG. 7C shows the contributions by $R_t$, $R_m$ and $R_i$ to total $R_{ohm}$ for various electrodes. Meanwhile, the upper right inset of FIG. 7C describes the iV characteristics of membrane-free cell equipped with CP and TP as anode DL.
Figure 8A:
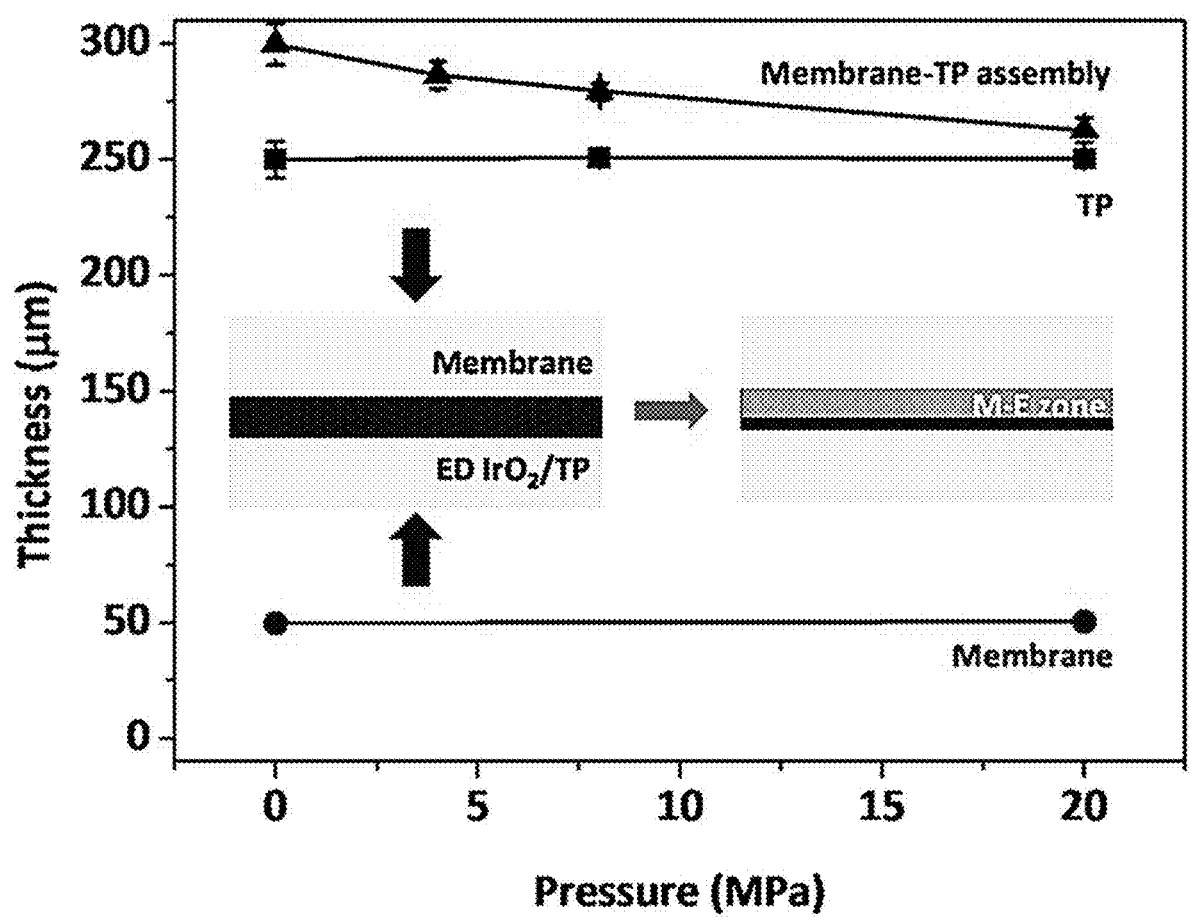
FIG. 8A shows a change in thickness of TP, membrane, and TP-membrane assembly after a compression (hot press) process under a pressure condition of 0 to 20 MPa.
Figure 8B:
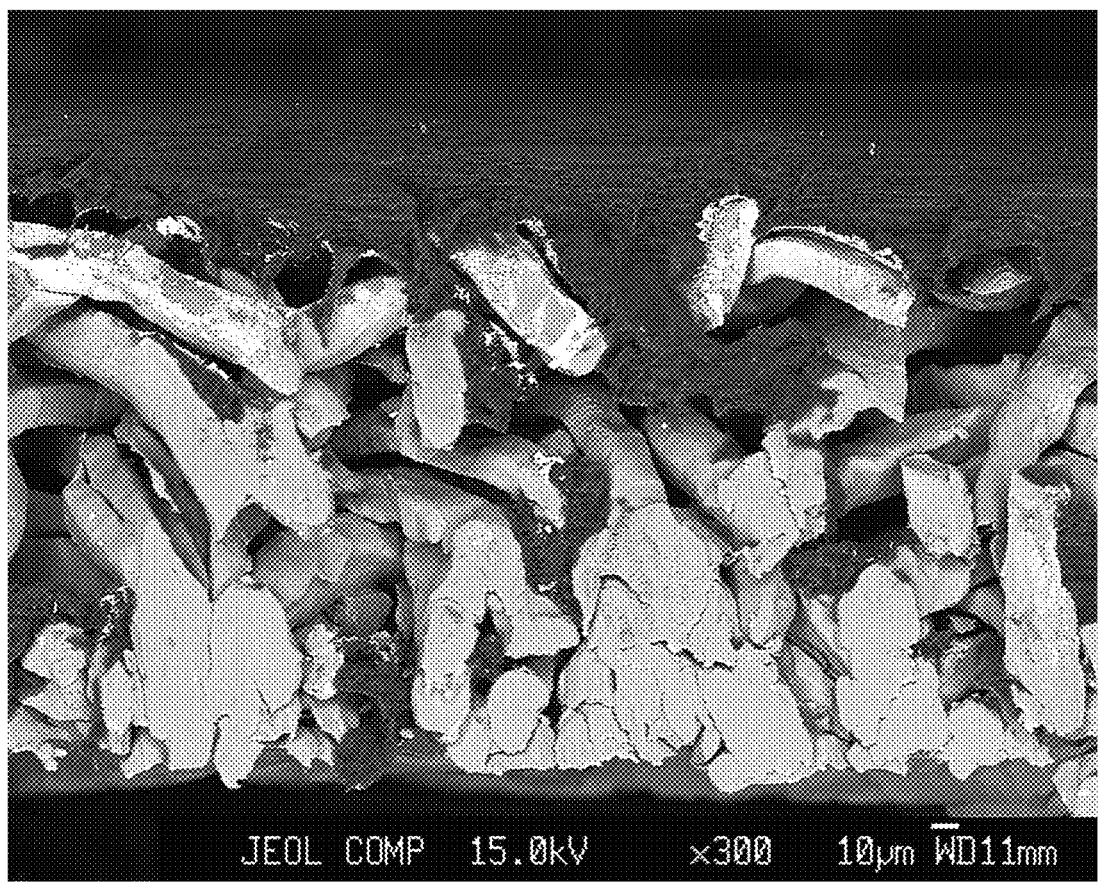
FIGS. 8B and 8C show cross-sectional images of $IrO_2$/TP-membrane assembly after hot press (FIG. 8B) and the corresponding EPMA result for F, Ti, and Ir (FIG. 8C).
Figure 8C:
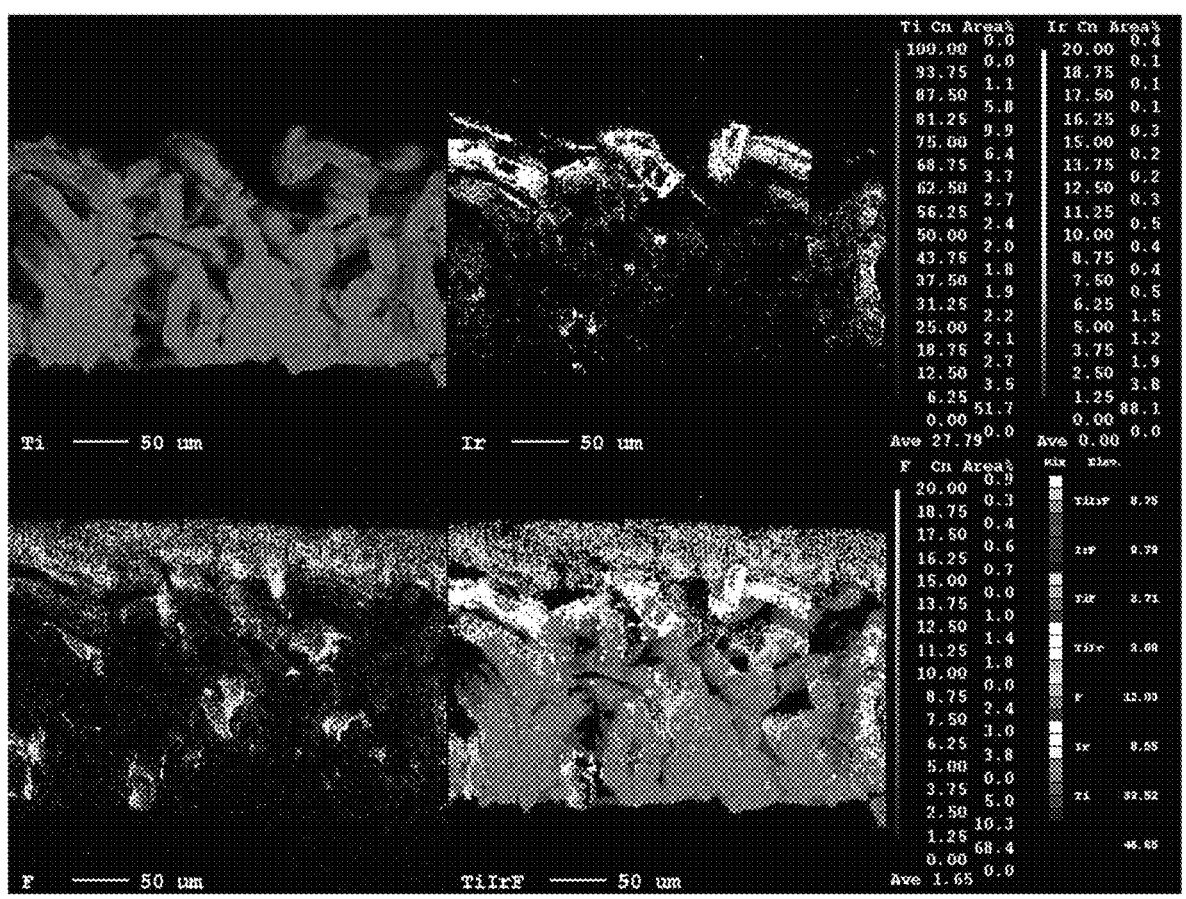
Figure 9A:
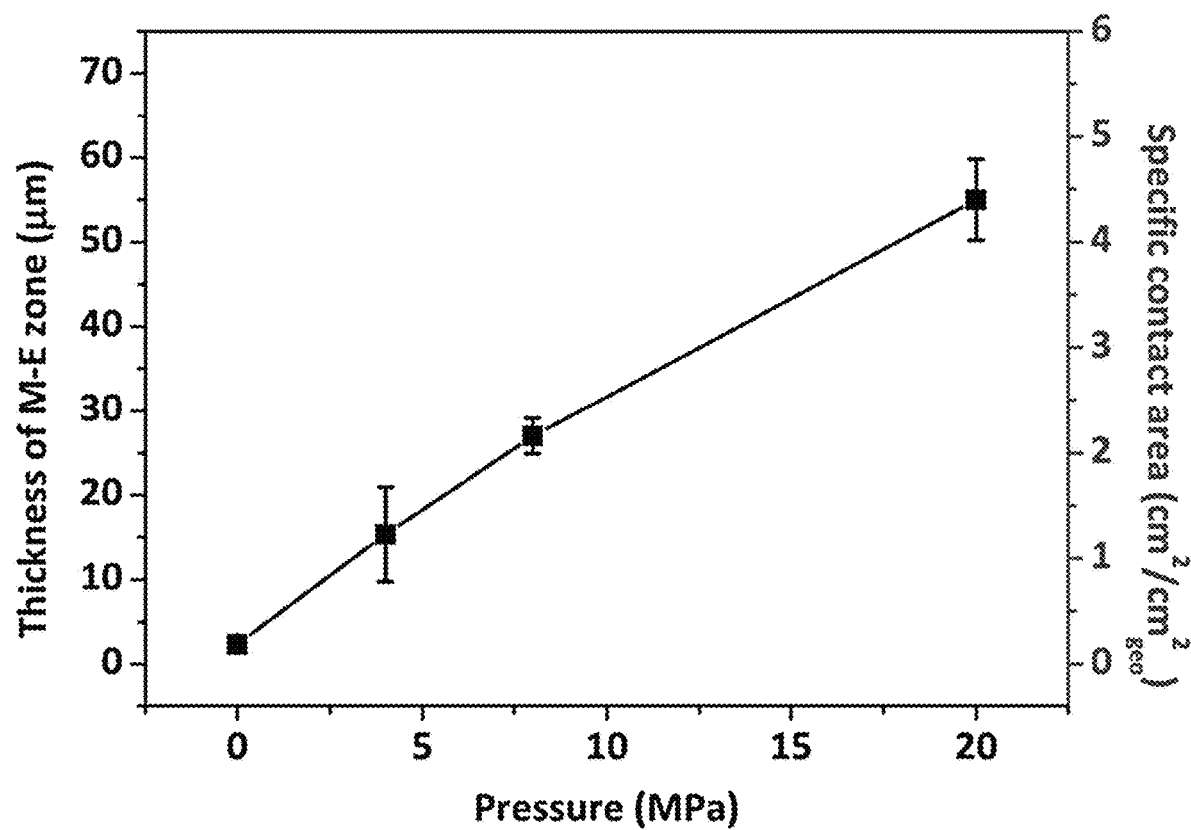
FIG. 9A shows thickness of M-E zone and corresponding contact area (Ac) between membrane-electrode in a change in pressure of the compression (hot press) process, and FIG. 9B describes $R_{i,m}$ according to a change in 1/Ac.

The individual contribution of $R_t$, $R_m$ and $R_{i,m}$ to total $R_{ohm}$ for various electrodes (IrO$_2$/CP, IrO$_2$/TP, HP—IrO$_2$/TP(@4 MPa), HP—IrO$_2$/TP(@8 MPa) and HP—IrO$_2$/TP(@20 MPa) are shown in FIG. 7C. When TP was used instead of CP, two noticeable changes were accompanied; the increase in $R_t$ from 0.034 Ω·cm$^2$ to 0.078 Ω·cm$^2$ because of nonconductive TiO$_2$ layers that was naturally formed on TP, and the increase in $R_{i,m}$ was increased from 0.028 Ω·cm$^2$ to 0.129 Ω·cm$^2$. It is believed that the difference in $R_{i,m}$ between CP and TP could be related with the roughness factor of substrate (CP: 35.7, TP: 20.0) that influences on the contact area between electrode and electrolyte. In addition, it was found that the application of hot press under a predetermined pressure condition significantly reduces the from 0.129 to 0.009 Ω/cm$^2$, and in order to confirm the changes of electrode, the thicknesses of IrO$_2$/TP, TP and a membrane were measured by performing a hot press process on IrO$_2$/TP, TP and the membrane under various pressure conditions. Unlike TP and membrane which were not compressed, the thickness of the membrane-TP assembly formed after the hot press for IrO$_2$/TP is significantly reduced, indicating the penetration of rigid TP body into the membrane electrolyte. The penetration depth was roughly proportional to applied pressure, and it could be confirmed that the compression process proceeded under a pressure condition of 4 MPa, 8 MPa, and 20 MPa resulted in the thickness reductions of 13.4, 20.4, and 37.2 μm, respectively. The inset of FIG. 8A schematically exhibited the assembly of TP and a membrane after the compression process, and it could be confirmed that when the TP body penetrated into the membrane, the zone (hereinafter, referred to as M-E zone) where the pore of TP was partially filled with the membrane was formed. The M-E zone provides an additional interface between electrode and electrolyte, which directly affects the $R_{if}$ and the 3-phase boundary, and the cross-sectional images and EPMA results of a membrane-TP assembly hot-pressed with 8 MPa are shown in FIGS. 8B and 8C. When FIGS. 8B and 8C are examined, it can be clearly seen that TP penetrates into the membrane and thus, the M-E zone is formed. An average vertical thickness of the M-E zone ($T_{M-E}$) and the corresponding electrode/electrolyte contact area (Ac) can be represented by [Equation 3] and [Equation 4].

$$t_{M-E} = \Delta t_a / p \quad \text{[Equation 3]}$$

$$A_C = \frac{A_r}{A_{geo}} * \frac{\Delta t_a}{p t_{Ti}} \cong \frac{4 t_{Ti}(1-p)}{D} * \frac{\Delta t_a}{p t_{Ti}} \cong \frac{4 \Delta t_a (1-p)}{p D} \quad \text{[Equation 4]}$$

Where $\Delta t_a$ denotes the thickness change of IrO$_2$/membrane assembly after a compression process, p denotes the porosity of TP, $t_{Ti}$ denotes the thickness of TP, and D is the diameter of Ti fiber. FIG. 9A shows a contact area corresponding to $t_{M-E}$ as a function of applied pressure. When 4 MPa, 8 MPa, and 20 MPa were applied, it could be confirmed that the average contact area was enlarged to 1.23, 2.16, and 4.40 cm$^2$/cm$^2_{geo}$. With an assumption that the is inverse proportional to Ac, the correlation between $R_{i,m}$ and Ac can be expressed as Equation 5.

$$R_{i,m} = \frac{\sigma}{A_c} \quad \text{[Equation 5]}$$

Figure 9B:
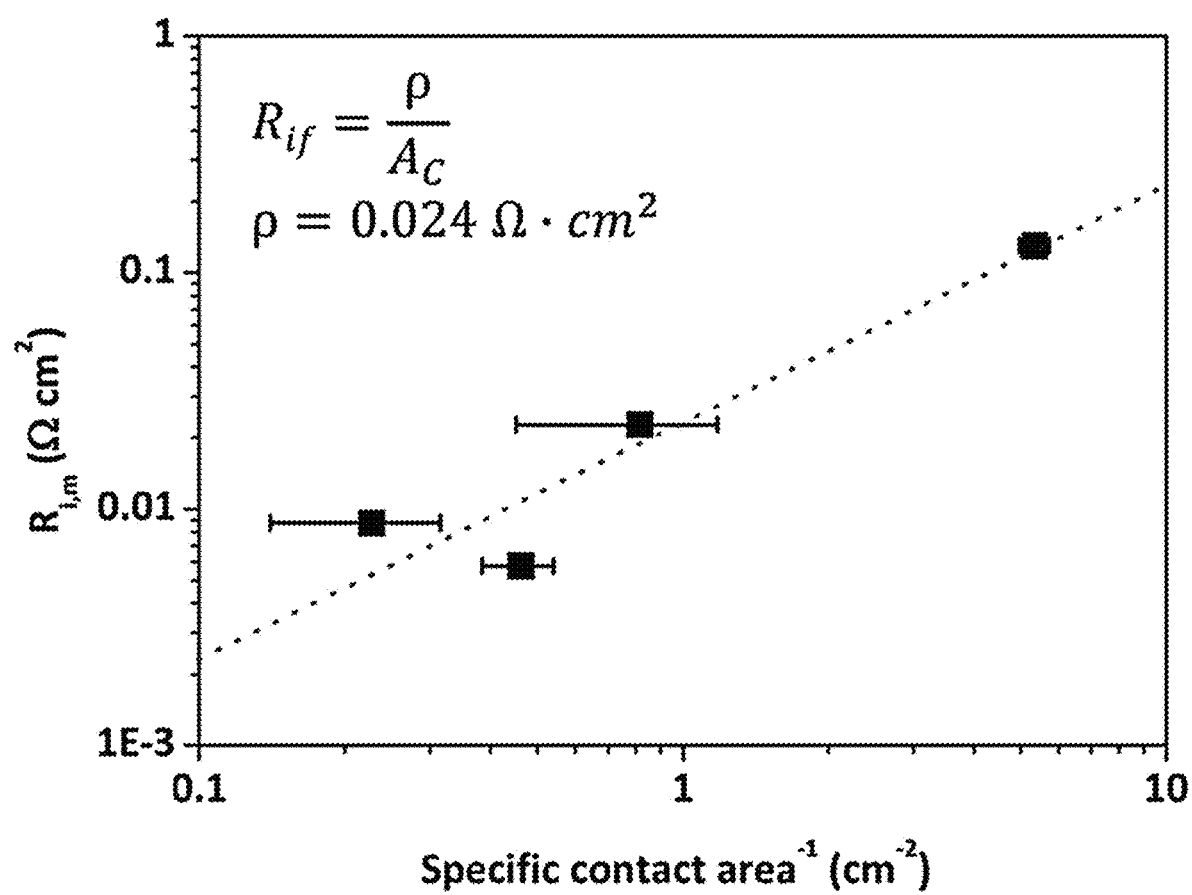

Meanwhile, FIG. 9B shows the $R_{if}$ as the function of 1/Ac, revealing the specific contact resistance (σ) to b e 0.024 Ω·cm$^4$.

Figure 10:
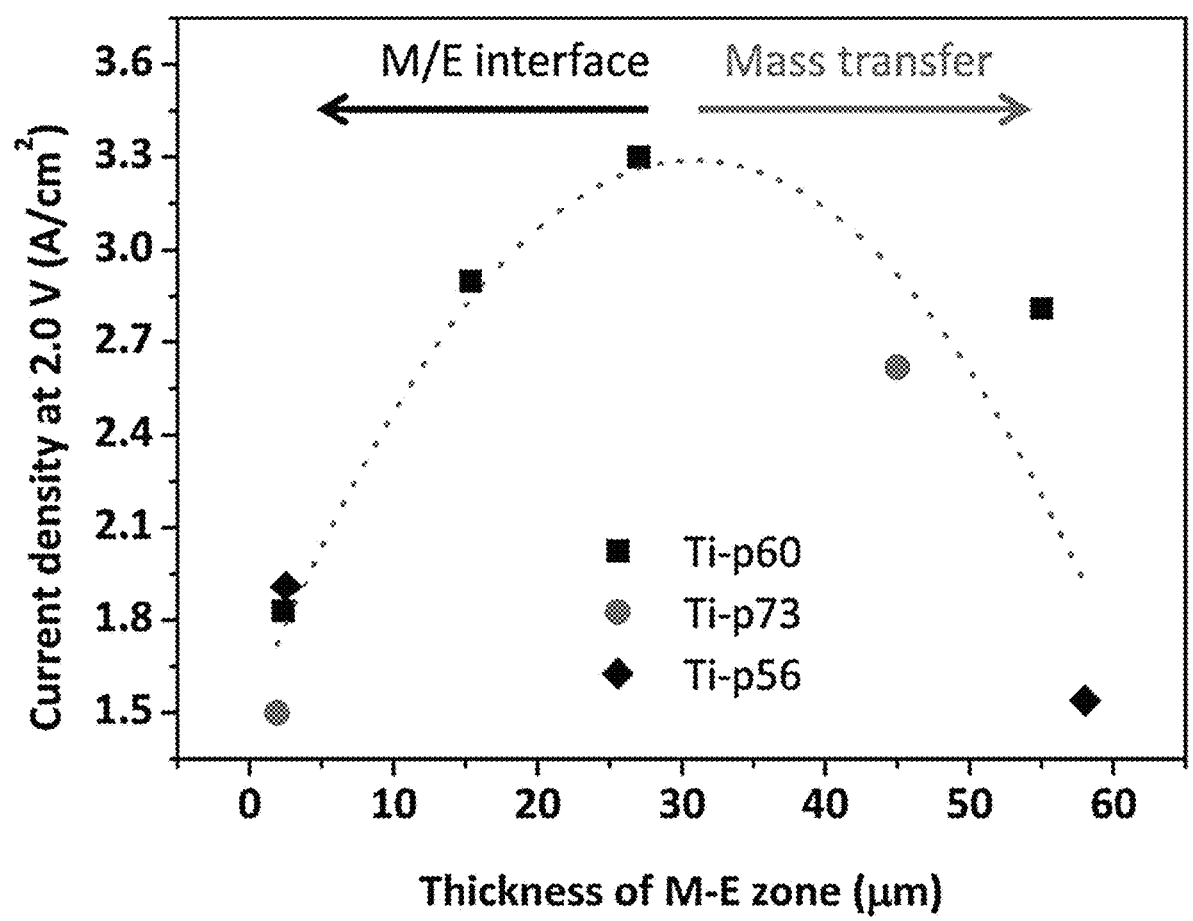
FIG. 10 shows current densities at 2.0 V as a function of M-E zone for various electrodeposited $IrO_2$/TP electrodes.

As described above, it could be confirmed that applying a hot press gave an additional electrode/electrolyte interface, but also caused disturbance of mass transfer. For generalization, electrodes were formed by electrodepositing IrO$_2$ onto Ti papers having porosity of 56%, 60%, and 73%, and then the current density at 2.0 V was calculated as a function of $t_{M-E}$ (FIG. 10). The highest current density was found at $t_{M-E}$ of about 30 μm. Under that value, the limited electrode/electrolyte interface may be provided, and Rohm as well as $R_{kin}$ may be increased. When $t_{M-E}$ exceeded 30 μm, it seemed that the access of $H_2O$ to electrolyte/electrode interface was blocked by membrane scraps in the pore of TP. It was confirmed that the best performance might be obtained when the electrode/electrolyte contact and the mass transfer of water met the balance (for example, $t_{M-E}$ of 30 µm).

Figure 11:
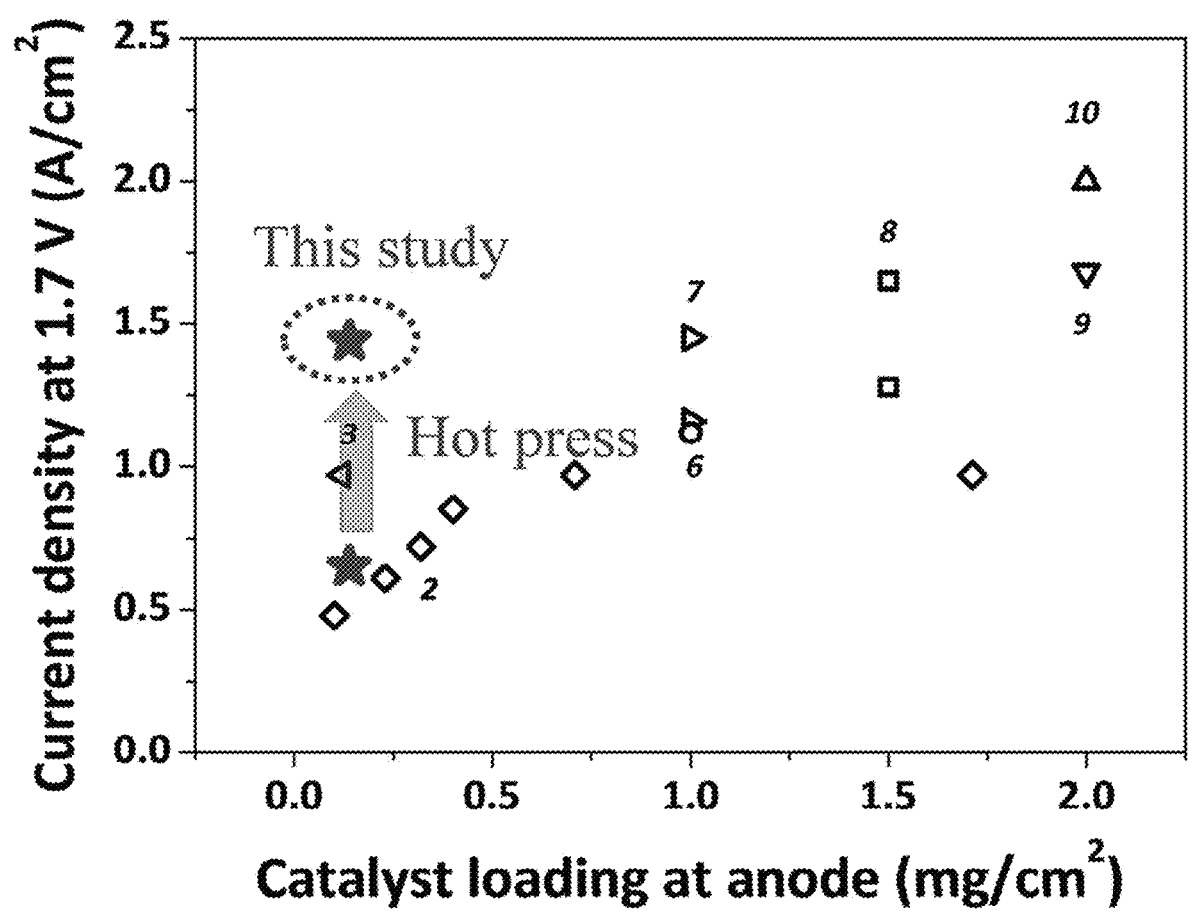
FIG. 11 shows cell voltages for the electrodeposited $IrO_2$/TP according to the catalyst loading at anode, and also describes matters on the related art.

Meanwhile, the performance of $IrO_2$/TP electrode after the compression process is compared with various electrodes reported in the reference documents. As in FIG. 11, it can be confirmed that the current density of $IrO_2$/TP electrode under 80° C. and 1.7 V conditions prior to hot press exhibited a value similar to the results of the reference document having a similar catalyst loading (Non-Patent Document 2), and the current density of $IrO_2$/TP electrode under 80° C. and 1.7 V conditions after hot press exhibited a value similar to those of cells having a catalyst loading of 1 to 1.5 mg/cm² (Non-Patent Documents 6, 7, and 8).

In the present disclosure as described above, effects of the one-side compression process will be described in an electrodeposited $IrO_2$ electrode for a proton exchange membrane water electrolyzer (PEMWE). An M-E zone where the pore of an $IrO_2$/diffusion layer was partially filled with electrolyte was formed by stacking an electrolyte membrane on the upper surface of the $IrO_2$/TP electrode, and then applying a compression process to allow the membrane electrolyte to penetrate into the $IrO_2$/TP electrode. A high thickness of the M-E zone provides a better electrode/electrolyte interface, but limits the access of $H_2O$. In an optimal M-E thickness, the cell voltage of the $IrO_2$/TP electrode under 1.0 A/cm² and 80° C. conditions was significantly reduced from 1.78 V to 1.64 V, and the value was comparable with those of a recent particle-type electrode with more catalyst loading of $IrO_2$ (1 to 3 mg/cm²). Therefore, it could be confirmed that for a PEMWE, an excellent film-type electrode could be prepared with a small amount of PGM metal.

The Examples of the present disclosure previously described should not be interpreted to limit the technical spirit of the present disclosure. The scope of the present disclosure to be protected is limited only by the matters described in the claims, and those skilled in the art of the present disclosure can improve and change the technical spirit of the present disclosure in various forms. Therefore, such improvements and changes would fall within the scope of the present disclosure to be protected as long as they are obvious to those skilled in the art.

What is claimed is:

1. A method of preparing a membrane electrode assembly for a proton exchange membrane water electrolyzer, the method comprising:

preparing an oxygen electrode comprising a titanium (Ti) layer which is a diffusion layer and an $IrO_2$ layer which is an oxygen electrode catalyst layer by electrodeposition of iridium oxide ($IrO_2$) onto the Ti layer to form the $IrO_2$ layer;

stacking an electrolyte membrane onto the $IrO_2$ layer of the oxygen electrode;

forming an oxygen electrode-electrolyte membrane assembly by performing a compression process on the oxygen electrode and the electrolyte membrane, wherein the Ti layer on which the $IrO_2$ is deposited comprises a plurality of pores and is divided into an upper zone and a lower zone, wherein pores of the upper zone of the Ti layer are partially filled with the electrolyte of the electrolyte membrane, and pores of the lower zone of the Ti layer are not filled with the electrolyte of the electrolyte membrane, and wherein, in order to increase an interface between the oxygen electrode and the electrolyte while preventing a disturbance of mass transfer of water, an M-E zone where pores are partially filled with the electrolyte of the electrolyte membrane in the upper zone of the Ti layer on which the $IrO_2$ is deposited has a thickness of 25 to 35 µm; and preparing the membrane electrode assembly by assembling a hydrogen electrode in which a hydrogen electrode catalyst layer is formed on a diffusion layer with one surface of the electrolyte membrane after the compression process.

2. The method according to claim 1, wherein the compression process is performed under a temperature condition of 120 to 160° C. for 1 min to 5 min.

3. The method according to claim 1, wherein the compression process is performed under a pressure condition of 4 to 20 MPa.

4. The method according to claim 1, wherein the Ti layer is titanium mesh or titanium paper.

5. The method according to claim 1, wherein a process of electrodepositing $IrO_2$ is performed under a deposition potential condition of 0.5 to 0.9 $V_{SCE}$ for 1 min to 10 min.

6. The method according to claim 1, wherein the $IrO_2$ layer comprises iridium oxide loaded at 0.01 to 1.05 mg/cm² onto the Ti layer.

7. The method according to claim 1, wherein prior to electrodeposition of $IrO_2$, the titanium layer is immersed into oxalic acid, and then rinsed with ionized water.

* * * * *